US007117440B2

(12) United States Patent  (10) Patent No.: US 7,117,440 B2
Gordon et al.  (45) Date of Patent: *Oct. 3, 2006

(54) METHOD AND APPARATUS FOR PROVIDING A MENU STRUCTURE FOR AN INTERACTIVE INFORMATION DISTRIBUTION SYSTEM

(75) Inventors: Donald F. Gordon, Los Altos, CA (US); Edward A. Ludvig, Redwood City, CA (US); Jeremy S. Edmonds, Sunnyvale, CA (US); Sadik Bayrakeri, Foster City, CA (US)

(73) Assignee: Sedna Patent Services, LLC, Philadelphia, PA (US)

( * ) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 6 days.

(21) Appl. No.: 09/359,562

(22) Filed: Jul. 22, 1999

(65) Prior Publication Data

US 2003/0052905 A1  Mar. 20, 2003

Related U.S. Application Data

(63) Continuation-in-part of application No. 08/984,427, filed on Dec. 3, 1997.

(60) Provisional application No. 60/093,891, filed on Jul. 23, 1998.

(51) Int. Cl.
*G06F 3/00* (2006.01)

(52) U.S. Cl. ...................... 715/721; 715/768

(58) Field of Classification Search ................ 345/720, 345/719, 721–726, 727–728, 821–824, 802, 345/792, 768; 725/41, 42, 54, 139; 709/245; 715/821–824, 860–861, 802, 790, 717–718, 715/719–726, 768, 805, 804, 853–855, 744–747, 715/749

See application file for complete search history.

(56) References Cited

U.S. PATENT DOCUMENTS

| 4,706,121 | A | 11/1987 | Young ........................ 358/142 |
| 4,751,578 | A | 6/1988 | Reiter et al. ................. 358/183 |
| 4,860,123 | A | 8/1989 | McCalley et al. ........... 358/342 |
| 4,885,775 | A | 12/1989 | Lucas ........................... 380/10 |
| 4,908,713 | A | 3/1990 | Levine ......................... 358/335 |
| 4,991,011 | A | 2/1991 | Johnson et al. .............. 358/141 |

(Continued)

FOREIGN PATENT DOCUMENTS

WO  94/30008  12/1994

*Primary Examiner*—Steven P. Sax
(74) *Attorney, Agent, or Firm*—Patterson & Sheridan, LLP

(57) ABSTRACT

A method and apparatus for providing an improved interactive menu structure for an on-screen program guide within an interactive information distribution system. The menu structure is generated in service provider equipment and delivered to subscriber equipment as a digital video bitstream. The menu structure enables a viewer to view program schedules in an interactive manner with substantially no latency when switching from one program guide page to another. A mask and reveal technique is used to provide an interactive environment through which a viewer can identify programming, preview programming, launch multi-media programming for viewing, and cause other events within an information distribution system to occur.

27 Claims, 24 Drawing Sheets

U.S. PATENT DOCUMENTS

| | | | |
|---|---|---|---|
| 5,038,211 A | 8/1991 | Hallenbeck | 358/142 |
| 5,070,400 A | 12/1991 | Lieberman | 358/84 |
| 5,151,789 A | 9/1992 | Young | 358/194.1 |
| 5,182,640 A | 1/1993 | Takano | 358/86 |
| 5,307,173 A | 4/1994 | Yuen et al. | 358/335 |
| 5,357,276 A | 10/1994 | Banker et al. | 348/7 |
| 5,359,601 A | 10/1994 | Wasilewski et al. | 370/73 |
| 5,400,402 A | 3/1995 | Garfinkle | 380/20 |
| 5,410,367 A | 4/1995 | Zahavi et al. | 348/725 |
| 5,477,262 A | 12/1995 | Banker et al. | 348/7 |
| 5,479,266 A | 12/1995 | Young et al. | 358/335 |
| 5,479,268 A | 12/1995 | Young et al. | 358/335 |
| 5,485,197 A | 1/1996 | Hoarty | 348/7 |
| 5,508,815 A | 4/1996 | Levine | 358/335 |
| 5,515,106 A | 5/1996 | Chaney et al. | 348/461 |
| 5,530,754 A | 6/1996 | Garfinkle | 380/5 |
| 5,532,754 A | 7/1996 | Young et al. | 348/569 |
| 5,550,576 A | 8/1996 | Klosterman | 348/6 |
| 5,568,272 A | 10/1996 | Levine | 386/48 |
| 5,583,560 A | 12/1996 | Florin et al. | 348/7 |
| 5,585,838 A | 12/1996 | Lawler et al. | 348/13 |
| 5,585,866 A | 12/1996 | Miller et al. | 348/731 |
| 5,594,509 A | 1/1997 | Florin et al. | 348/731 |
| 5,596,373 A | 1/1997 | White et al. | 348/569 |
| 5,619,249 A | 4/1997 | Billock et al. | 348/7 |
| 5,625,406 A | 4/1997 | Newberry et al. | 348/7 |
| 5,644,354 A | 7/1997 | Thompson et al. | 348/13 |
| 5,710,601 A | 1/1998 | Marshall et al. | 348/564 |
| 5,768,491 A * | 6/1998 | Lobodzinski et al. | 345/620 |
| 5,812,123 A * | 9/1998 | Rowe et al. | 345/720 |
| 5,822,123 A | 10/1998 | Davis et al. | 348/564 |
| 5,850,232 A * | 12/1998 | Engstrom et al. | 345/539 |
| 5,903,816 A | 5/1999 | Broadwin et al. | 455/3.1 |
| 5,933,141 A * | 8/1999 | Smith | 345/768 |
| 5,966,162 A | 10/1999 | Goode et al. | 348/10 |
| 5,987,245 A | 11/1999 | Gish | 395/680 |
| 6,002,394 A | 12/1999 | Schein et al. | 345/327 |
| 6,006,256 A * | 12/1999 | Zdepski et al. | 709/217 |
| 6,016,144 A * | 1/2000 | Blonstein et al. | 345/802 |
| 6,018,372 A * | 1/2000 | Etheredge | 348/569 |
| 6,025,837 A | 2/2000 | Matthews, III et al. | 345/327 |
| 6,049,831 A | 4/2000 | Gardell et al. | 709/236 |
| 6,061,097 A * | 5/2000 | Satterfield | 348/569 |
| 6,064,376 A * | 5/2000 | Berezowski et al. | 345/720 |
| 6,141,003 A * | 10/2000 | Chor et al. | 715/719 |
| 6,160,546 A * | 12/2000 | Thompson et al. | 345/721 |
| 6,163,316 A | 12/2000 | Killian | 345/327 |
| 6,172,674 B1 | 1/2001 | Etheredge | 345/720 |
| 6,208,335 B1* | 3/2001 | Gordon et al. | 715/721 |
| 6,212,680 B1* | 4/2001 | Tsinberg et al. | 725/39 |
| 6,263,501 B1* | 7/2001 | Schein et al. | 725/39 |
| 6,357,046 B1* | 3/2002 | Thompson et al. | 725/139 |
| 6,415,437 B1* | 7/2002 | Ludvig et al. | 725/41 |
| 6,473,804 B1 | 10/2002 | Kaiser et al. | 709/245 |
| 6,481,010 B1* | 11/2002 | Nishikawa et al. | 725/44 |
| 6,567,106 B1 | 5/2003 | Wugofski | 715/764 |
| 6,578,201 B1* | 6/2003 | LaRocca et al. | 725/86 |
| 6,580,441 B1* | 6/2003 | Schileru-Key | 715/805 |
| 6,704,028 B1* | 3/2004 | Wugofski | 715/719 |
| 6,754,905 B1* | 6/2004 | Gordon et al. | 725/38 |
| 6,874,129 B1* | 3/2005 | Smith | 715/803 |
| 2001/0012022 A1* | 8/2001 | Smith | 345/768 |
| 2003/0035007 A1* | 2/2003 | Wugofski | 345/764 |
| 2003/0083533 A1* | 5/2003 | Gerba et al. | 585/367 |

* cited by examiner

METHOD AND APPARATUS FOR PROVIDING A MENU STRUCTURE FOR AN INTERACTIVE INFORMATION DISTRIBUTION SYSTEM

CROSS REFERENCE TO RELATED APPLICATIONS

This application is a continuation in part of U.S. patent application Ser. No. 08/984,427, filed on Dec. 3, 1997, which is hereby incorporated herein by reference in its entirety.

This application claims benefit of U.S. Provisional Patent Application Ser. No. 60/093,891 filed on Jul. 23, 1998, which is hereby incorporated by reference in its entirety.

BACKGROUND OF THE INVENTION

1. Field of the Invention

The present invention relates to an interactive information distribution system such as a video-on-demand (VOD) system. More particularly, the present invention relates to a method and apparatus for providing an interactive menu structure, i.e., an on-screen program guide, for such an interactive information distribution system.

2. Description of the Background Art

Recent advances in digital signal processing techniques, and in particular, improvements in digital compression techniques, have led to a plethora of proposals for providing new digital services to a customer's home via existing telephone and coaxial cable networks. For example, it has been proposed to provide hundreds of cable television channels to subscribers by compressing digital data, digital video, transmitting compressed digital video over conventional coaxial cable television channels, and then decompressing the video in the subscriber's set top terminal. Another proposed application for this technology is a video-on-demand system in which a subscriber communicates directly with a video service provider via telephone lines to request a video program from a video library and the requested video program is routed to the subscriber's home via telephone lines or via coaxial cable television cables for immediate viewing. Other proposed video-on-demand systems use a frequency multiplexing technique to enable control information for a set top terminal to be transmitted through a cable network back to an information server. Such a system permits bi-directional communication over a single network.

In each of these information distribution systems, menus are displayed upon the subscriber's television and using a remote control device, a subscriber selects a desired program for viewing. A program code is then sent from the set top terminal through the communication system back to the service provider. The selected program is then recalled from memory by the service provider equipment and broadcast to the set top terminal that requested that information. Alternatively, the subscriber may telephone the service provider and request certain information that is displayed in a menu upon the subscriber's television. In any event, the currently available systems generally do not provide an interactive menu structure through which to select programming. Usually the menus are rudimentary text listings of available programs. By scrolling through the lists of programs using a remote control device the user selects desired programming. These text-based menus do not contain any graphics, video, or other material that would provide an entertaining interactive session. Two such systems are disclosed in U.S. Pat. No. 5,357,276 issued Oct. 18, 1994 and U.S. Pat. No. 5,477,262 issued Dec. 19, 1995.

Therefore, there is a need in the art for a method and apparatus for providing an improved interactive menu structure for an interactive information distribution system.

SUMMARY OF THE INVENTION

The disadvantages heretofore associated with the prior art are overcome by the present invention of a method and apparatus for providing an improved interactive menu structure for an on-screen program guide within an interactive information distribution system. The invention is embodied in a combination of software, which provides a so-called "navigator", and hardware, including a set top terminal that provides certain functionality for the navigator and a video session manager which supports the functionality of the set top terminal. As such, the navigator functions are distributed between service provider equipment (video session manager) and subscriber equipment (set top terminal). Such distribution provides an enjoyable, real-time interactive session that allows the subscriber to rapidly navigate through a plethora of menus to find particular information which the subscriber desires to view.

More specifically, the interactive information distribution system comprises service provider equipment connected to subscriber equipment through a communications network. The service provider equipment includes an information server coupled to a video session manager. The video session manager contains a modulator for modulating information provided by the server into a form that can be transmitted through the network to the subscriber equipment. The video session manager also contains a modem for communicating command and control information between the service provider equipment and subscriber equipment.

The subscriber equipment includes a set top terminal that is connected to a display device such as a television and an input device such as an infrared (IR) or radio-frequency (RF) remote control. The user while viewing the display device may select a number of menus using the input device as the menus are presented from the set top terminal upon the television screen. Any commands which the user transmits to the set top terminal that are not handled by the set top terminal itself are communicated through the network to the service provider equipment, demodulated by the modem and implemented by the video session manager. The video session manager forms an interface between the modem and the server such that the video session manager may coordinate billing, ensure that proper programming is sent through the network and addressed properly to the set top terminal requesting that programming, and interact with the server.

A navigator menu structure is a series of interconnected "applets" (e.g., a linked list of programs). Each applet contains certain data for producing interactive menu imagery (screen) as well as control instructions that provide functionality for the menu. The applet data generally contains two components. There are the underlying video images (background video) which provides so-called entertaining "eye candy" and selectable icons for the viewer. Additionally, there is an overlay screen which provides the interactive functionality and command structure for the navigator. The overlay screen is produced using the on-screen display (OSD) functions of a video decoder within the set top terminal. Particular applets are sent through the network to the set top terminal in response to a particular command from the subscriber.

Specifically, when a subscriber selects a functional icon within a given menu, an applet for a new menu corresponding to the selected icon is downloaded from the server through the modem and the network to the set top terminal. The applet is contained in a compressed, packetized video stream. This stream conforms to the compression and transport protocols of a standard video transmission protocol such as the Moving Pictures Experts Group (MPEG) protocol.

As soon as the background video associated with the applet is available for display, the video decoder displays the video on the television screen. Additionally, the OSD overlay(s) are displayed "over" the background video. These OSD graphics facilitate certain interactive functions such that when the user manipulates a joystick or other selection instrument particular regions become highlighted. The user then selects a highlighted region for implementation of a function represented by the highlighted region. The region generally changes in some manner indicating that that graphic has been selected. The display of the overlays is handled by a microprocessor within the set top terminal as well as an on-screen display graphics processor within the video decoder of the set top terminal. Selecting a region or icon on the screen will send a command to the video session manager for implementation. In response, the video session manager sends a new applet representing another menu (e.g., the next applet in the linked list) or a multimedia selection such as a movie.

The navigator menu structure may be conveniently described in terms of a video layer, a graphics layer and a control layer. The video layer comprises the displayed video images produced using, e.g., information contained in an applet. The graphics layer comprises OSD overlay(s) including graphical objects which are associated with applets stored in either subscriber or provider equipment. The OSD overlay(s) are displayed over the video layer. As such, the OSD layer can be transparent to allow much of the underlying video to be seen while positioning certain graphics upon the video, or the OSD graphics can be opaque such that, by turning the graphics on and off the underlying video is either masked or revealed. The control layer comprises a command processing and logical operations layer. The control layer retrieves the applets associated with graphic layer objects selected by a user, executes the applets, provides video information to the video layer and objects information to the graphics layer.

The navigator is one example of the type of menu structure that benefits from the various inventive techniques of the present invention. An additional menu structure is a program guide. A program guide provides the viewer with a list of programs that are available through the information distribution system. The programs are usually presented as a graphic having a grid pattern with one axis of the grid being time and the other axis of the grid being program channels. Within the grid are cells that contain the titles of the available programs at the time of availability. The viewer may interact with the program guide by identifying or selecting cells that are then "highlighted" using the overlay graphics and the mask and reveal technique. In operation, a viewer moves a selector on a remote control or other interface device to identify a program title (the title is highlighted), then the viewer selects the title by depressing a SELECT button on the remote control. The system then supplies the selected program to the subscriber equipment if the program is available. If the program is not available to that viewer because the viewer does not have access to that particular service or the program is simply not available at the current time, the viewer may be shown a preview of the program.

One illustrative program guide comprises a graphics region wherein the program guide graphics are shown and a video region wherein one or more video images are displayed. The video images may be a video barker with associated audio that invites viewers to purchase additional services, advertising that invites viewers to purchase products or services, previews of available or upcoming programming, movie trailers and the like.

BRIEF DESCRIPTION OF THE DRAWINGS

The teachings of the present invention can be readily understood by considering the following detailed description in conjunction with the accompanying drawings, in which:

FIG. 6 depicts the appropriate alignment of FIGS. 6A and 6B;

To facilitate understanding, identical reference numerals have been used, where possible, to designate identical elements that are common to the figures.

DETAILED DESCRIPTION

The invention is a method and apparatus that provides an improved interactive menu structure for an on-screen program guide for use with an information distribution system. The inventive menu structure shall hereinafter be referred to as a "navigator" or, alternatively, as a program guide. Although the navigator of the present invention can be implemented and executed using a number of different types of information distribution system, the preferred embodiment is used in combination with the hardware described below. The interactive information distribution system described below is disclosed in detail in U.S. patent application Ser. No. 08/984,710 filed Dec. 3, 1997 and incorporated herein by reference. However, this specific hardware arrangement is considered illustrative of the type of system with which the invention is used. Any other hardware arrangement that facilitates information distribution is considered capable of providing a platform for the present invention.

Figure 1:
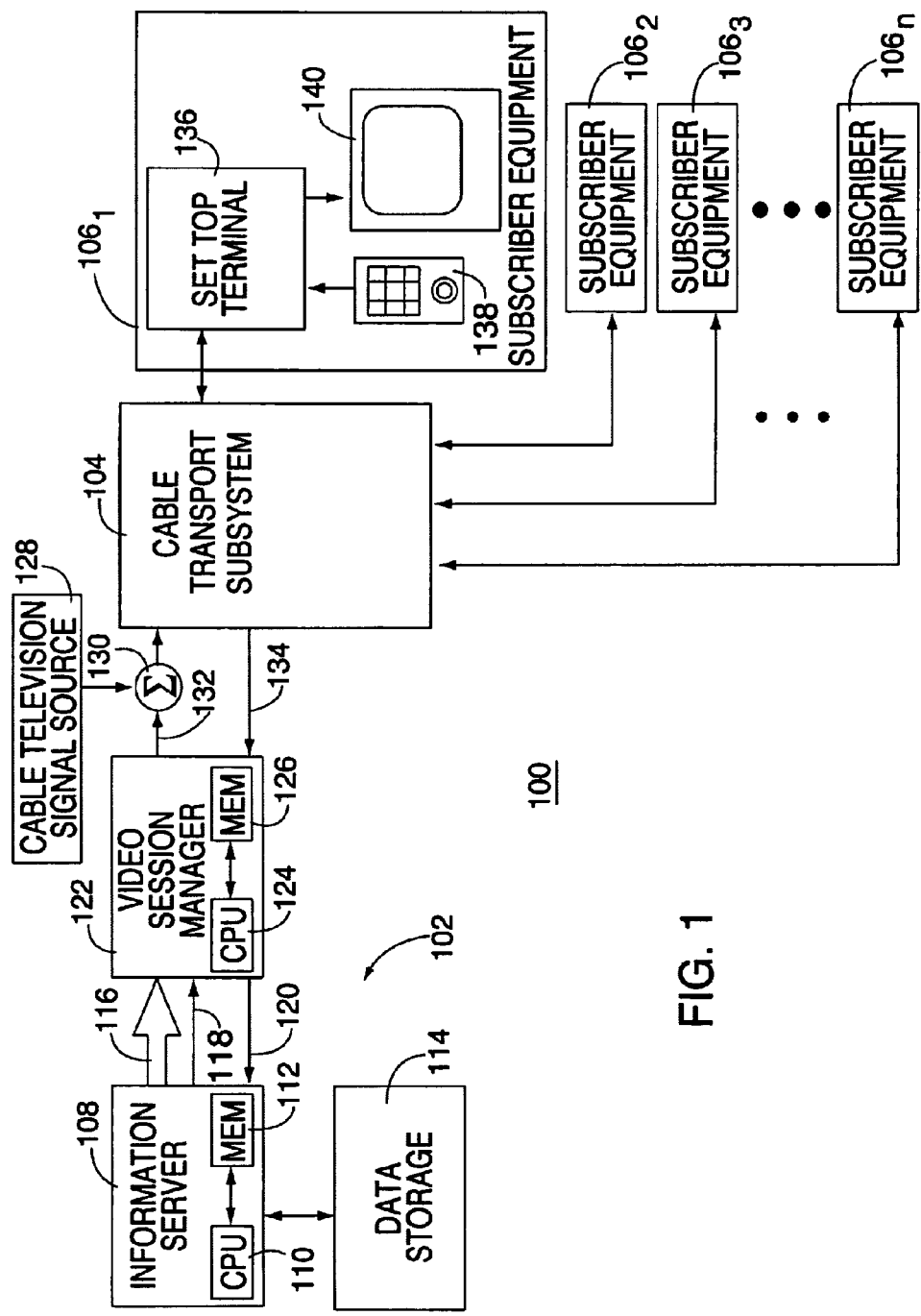
FIG. 1 depicts a high level block diagram of an interactive information distribution system containing the present invention.

FIG. 1 depicts a high level block diagram of the illustrative information distribution system 100 that incorporates the present invention. The system contains service provider equipment 102, a communications network 104 and subscriber equipment 106$_n$, where n is an integer greater than zero. The service provider equipment 102 contains an information server 108 which is typically a parallel processing computer containing at least one central processing unit 110 and associated memory 112. The server interacts with a data storage device 114 (e.g., a disk drive array) that generally stores the subscriber information (e.g., video data) that will be recalled and downloaded to the subscriber. Additionally, within the service provider equipment is a video session manager 122 that provides session control of the information flowing to and from the server. Furthermore, the video session manager 122 contains its own central processing unit 124 and associated memory 126.

The information server 108 is coupled to the video session manager via data path 116, synchronization clock path 118 and control path 120. The server 108 provides data streams on path 116 and a synchronization clock on path 118 in response to requests for information from the video session manager on path 120. These data streams are packetized and modulated onto a carrier that is compatible with the transmission requirements of the network 104.

The video session manager 122 accomplishes all of the transmission interface requirements of the system 100. Specifically, the video session manager 122 is coupled to subscriber equipment via a forward information channel 132, a forward command channel 133 and a back channel 134. All three of these channels are supported by the cable transport network. The video session manager contains a modulator for modulating the server data streams onto one or more carrier frequencies for transmission on the forward information channel. Additionally, the video session manager contains a modem for sending control information via the forward command channel and receiving control information via the back channel. Moreover, a conventional cable television signal source 128 is optionally coupled to the forward information channel via a signal coupler 130.

The network 104 can be any one of a number of conventional broadband communications networks that are available such as a fiber optic network, a telephone network, existing cable television network and the like. For example, if the network is a hybrid fiber-coax network, the transmission transport technique used in both forward channels may be modeled after the Moving Pictures Expert Group (MPEG) transport protocol for the transmission of video data streams. In general, the transport mechanism for both of the forward channels that transport information to the set top terminal must be able to carry unidirectional, asynchronous packetized data such as that defined in the MPEG video and audio signal transmission protocol, and the like. There are a number of such transport protocols available.

Each set top terminal 106 receives the data streams from the forward information channel, demodulates those streams and processes them for display on the display device 140 (e.g., a conventional television). In addition, the set top terminal 106 accepts commands from a remote control input device 138 or other input device. These commands are formatted, compressed, modulated, and transmitted through the network 104 to the video session manager 122. Typically, this transmission is accomplished through the back channel 134. These commands are preferably transmitted through the same network used to transmit information to the set top terminal. However, the back channel coupling the set top terminal to the server may be a separate network, e.g., a forward information channel through a television cable network and a back channel through a telephone network. The telephone network could also support the forward control channel. The video session manager 122 interprets each command sent from the set top terminal through the back channel and instructs the information server to perform certain functions to implement the subscriber request.

Figure 2:
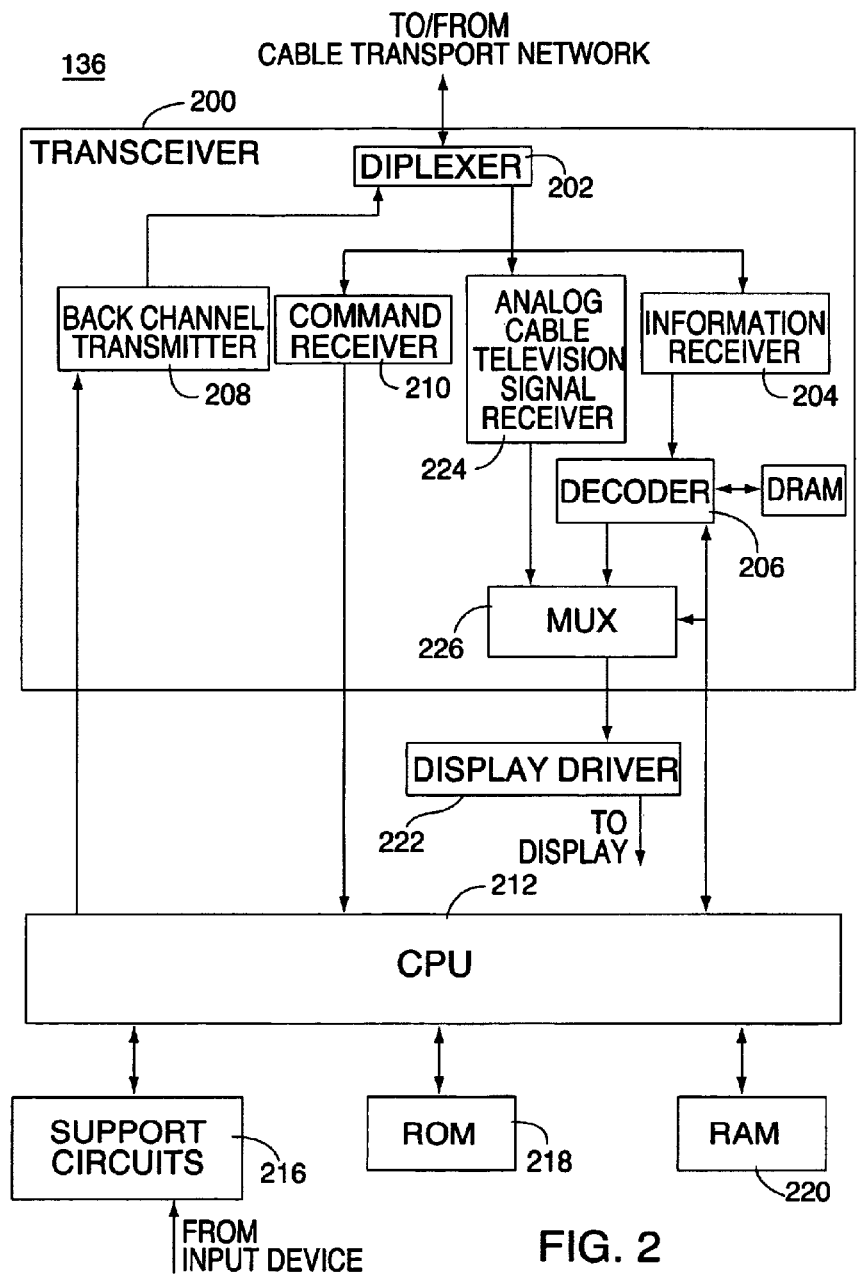
FIG. 2 depicts a block diagram of an illustrative set top terminal within the system of FIG. 1.

FIG. 2 depicts a block diagram of the set top terminal 136 which contains a transceiver 200, a central processing unit (CPU) 212 and a display driver 222. Of course, the functionality of the set top terminal 136 can be imbedded within a single consumer electronics product such a television. As such, the description of a stand-alone set top terminal should be considered illustrative of the type of subscriber equipment that may be used to implement the present invention. Within the set top terminal 136, the CPU 212 is supported by random access memory (RAM) 220, read only memory (ROM) 218 and various support circuits 216 such as clocks, power supply, an infrared receiver and the like. The transceiver 200 contains a diplexer 202, a back channel transmitter 208, an information channel receiver 204, a command channel receiver 210, an information decoder 206, a conventional television signal receiver 224, and a multiplexer 226. The diplexer 202 couples the three channels carried by a single cable within the network to the transmitter and receivers.

Each receiver 204 and 210 contains a tuner, amplifiers, filters, a demodulator, and a depacketizer. As such, the receivers tune, downconvert, and depacketize the signals from the cable network in a conventional manner. The information channel receiver 204 contains a conventional QAM demodulator such as a model BCM3115 manufactured by the Broadcom Corporation. Other such demodulators are well-known in the communications arts and could be used in this application. However, this particular QAM demodulator also contains a built in "out-of-band" QPSK demodulator for handling command channel data carried by the forward command channel. As such, a single integrated circuit demodulates both subscriber requested information (audio and video) as well as command data.

The decoder 206 processes the data packets carrying subscriber requested information produced by the QAM demodulator into useable signals for the end user display, e.g., television, home studio, video recorder and the like. The decoder is coupled to a dynamic random access memory (DRAM) to facilitate decoding of the data packets and processing of applets, as shall be discussed below. The signals for display are conventionally processed by a display driver 222 to produce composite video as well as a conventional television signal, e.g., modulated onto channel 3 or 4 using the NTSC standard modulation.

The conventional cable television signal receiver 224 contains a tuner and an analog (NTSC) demodulator. A multiplexer 226 couples the demodulated analog or decoded video signal to the display drive 222. Of course, the NTSC demodulator can be replaced with a PAL or SECAM standard demodulator, as needed.

The demodulated QPSK signal provides command and control information to the CPU 212 for generating certain graphics and control interface regions upon a television screen. The CPU is, for example, a Model 68302 processor manufactured by Motorola. This processor, operating in combination with the decoder 206 as well as a continuously available video signal from the information channel, produces screen displayed buttons, icons and graphical regions with which a subscriber interacts using the remote control. Without the video signal the set top terminal does not produce any display, i.e., the displays are actively generated in real time as needed to facilitate certain navigation functions.

Specifically, a joystick on the remote control selectively highlights certain pre-defined regions of the television screen. To perform such highlighting, a reference region is always highlighted when a menu is first displayed. From that reference region, direction vectors produced by the joystick are interpreted by the CPU to highlight a region lying in the direction in which the joystick was moved. When a desired selectable icon is highlighted, the subscriber depresses a "select" key on the remote that sends an infrared signal to an infrared receiver (a support circuit 216). This receiver sends the select command to the CPU for interpretation. The selected region is associated with a function. If the function is a request for specific information or a change in the menu, the processor formats the command and sends it to the back channel transmitter for transmission to the video session manager. If the command is a function that is handled locally such as volume control, the CPU implements the function within the set top terminal.

Since the session control commands are implemented by the video session manager and not the set top terminal alone, the number of available session control commands is infinite. Each command is implemented by the execution of an applet, as described below. The applets control both information sessions, e.g., the presentation of video to the television screen, and navigator functions, e.g., the menus that facilitate selection of a video program. As such, particular commands include, but are not limited to, information or menu navigation commands, movie start at beginning, movie start at the middle, play, stop, rewind, forward, pause, and the like. These presentation and navigation control commands are sent via a back channel transmitter 208 using binary phase shift key (BPSK) modulation. Additionally, the CPU in the set top terminal implements certain local commands such as increment or decrement the volume, channel change, and on/off.

The invention is implemented as one or more interrelated "applets" which, when taken together, form the navigator of the present invention. The applets are transmitted, for the most part, to the set top terminal via the forward information channel. Certain information used by particular applets is transmitted to the set top terminal via the forward command channel. As such, each applet is demodulated and decoded prior to execution that displays a menu on the display device. The detailed process by which an applet is downloaded and used to produce a menu is disclosed with respect to FIGS. 6 and 7 below.

Figure 3:
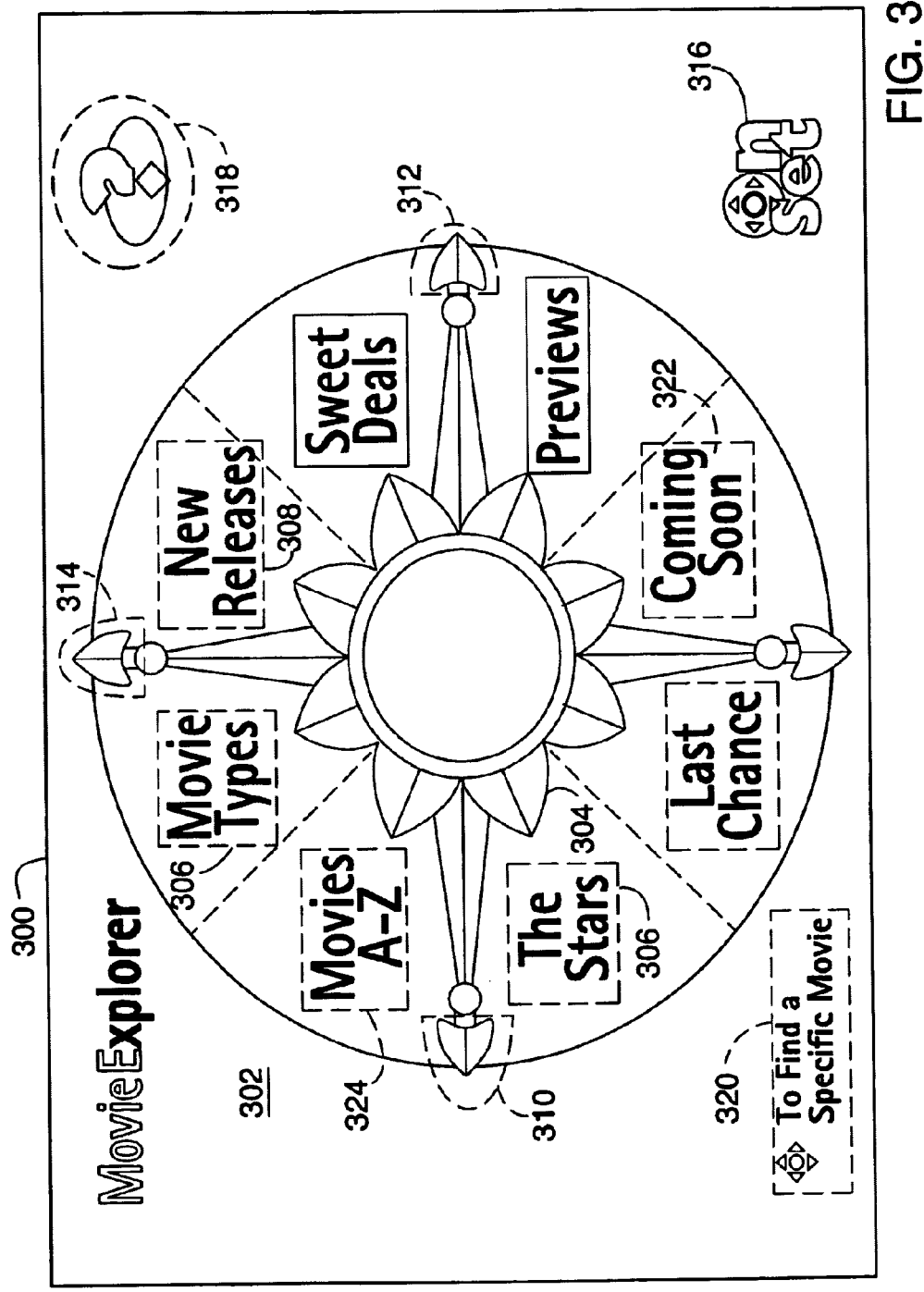
FIG. 3 depicts an illustrative "compass" menu display.
Figure 10:
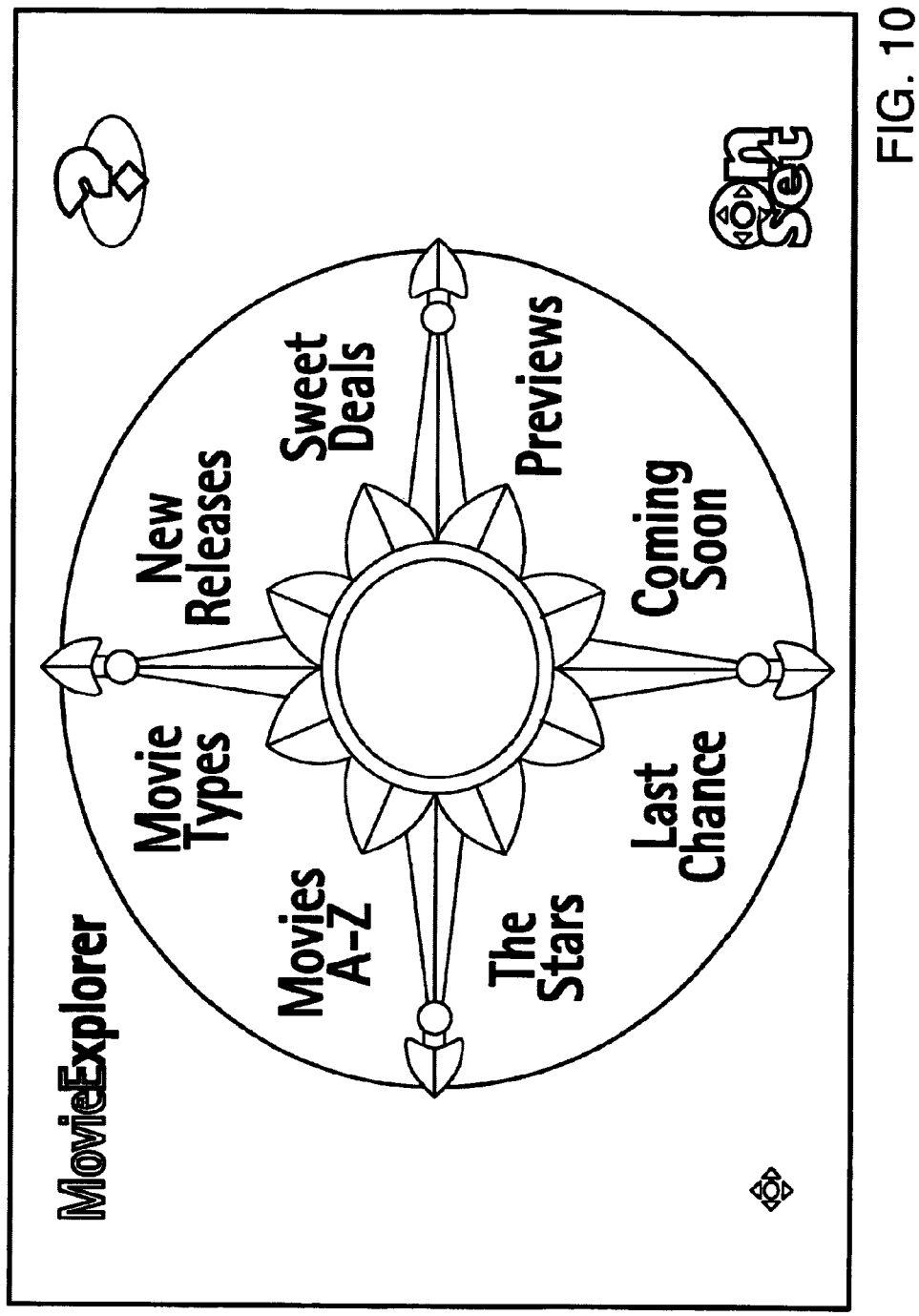
FIG. 10 depicts a "compass" menu.
Figure 11:
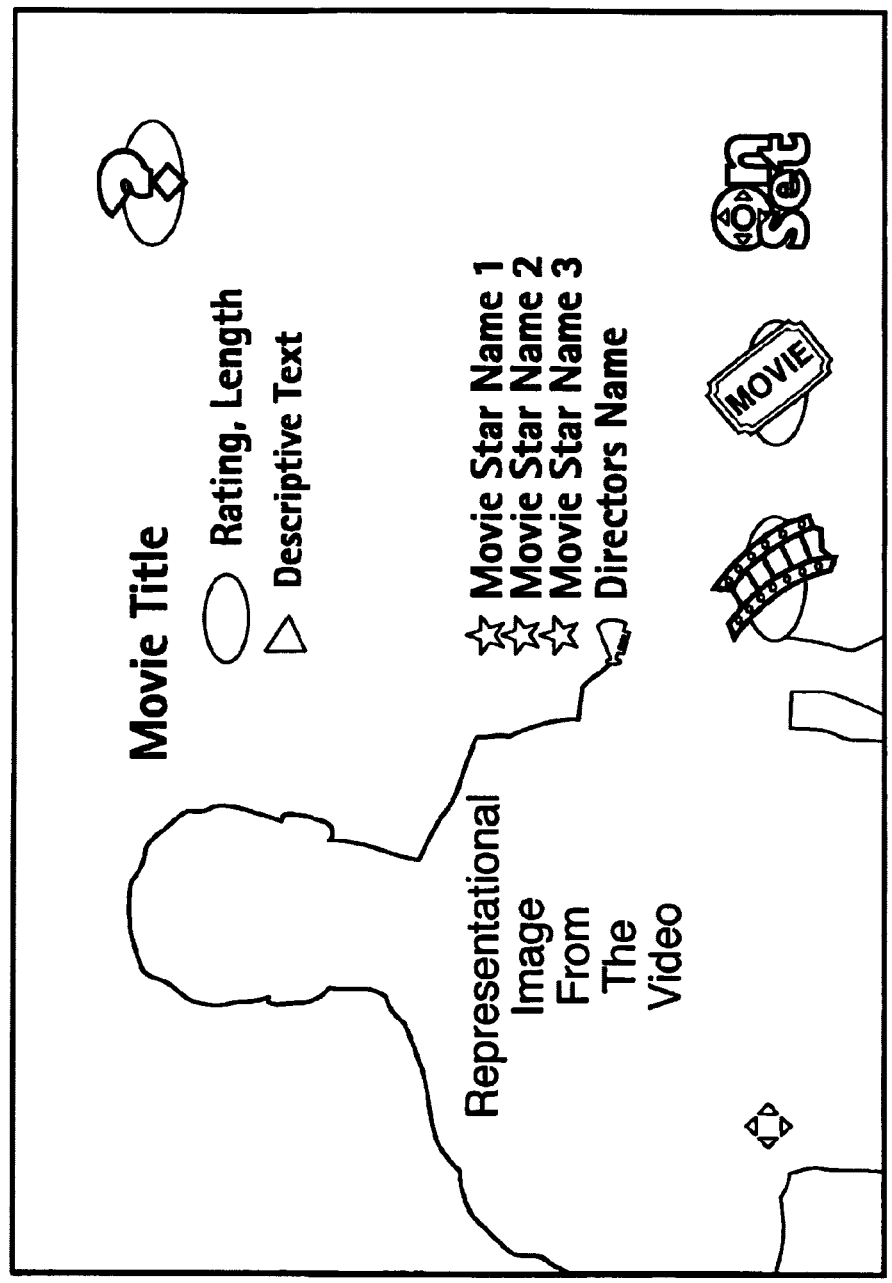
FIG. 11 depicts a movie information screen.
Figure 12:
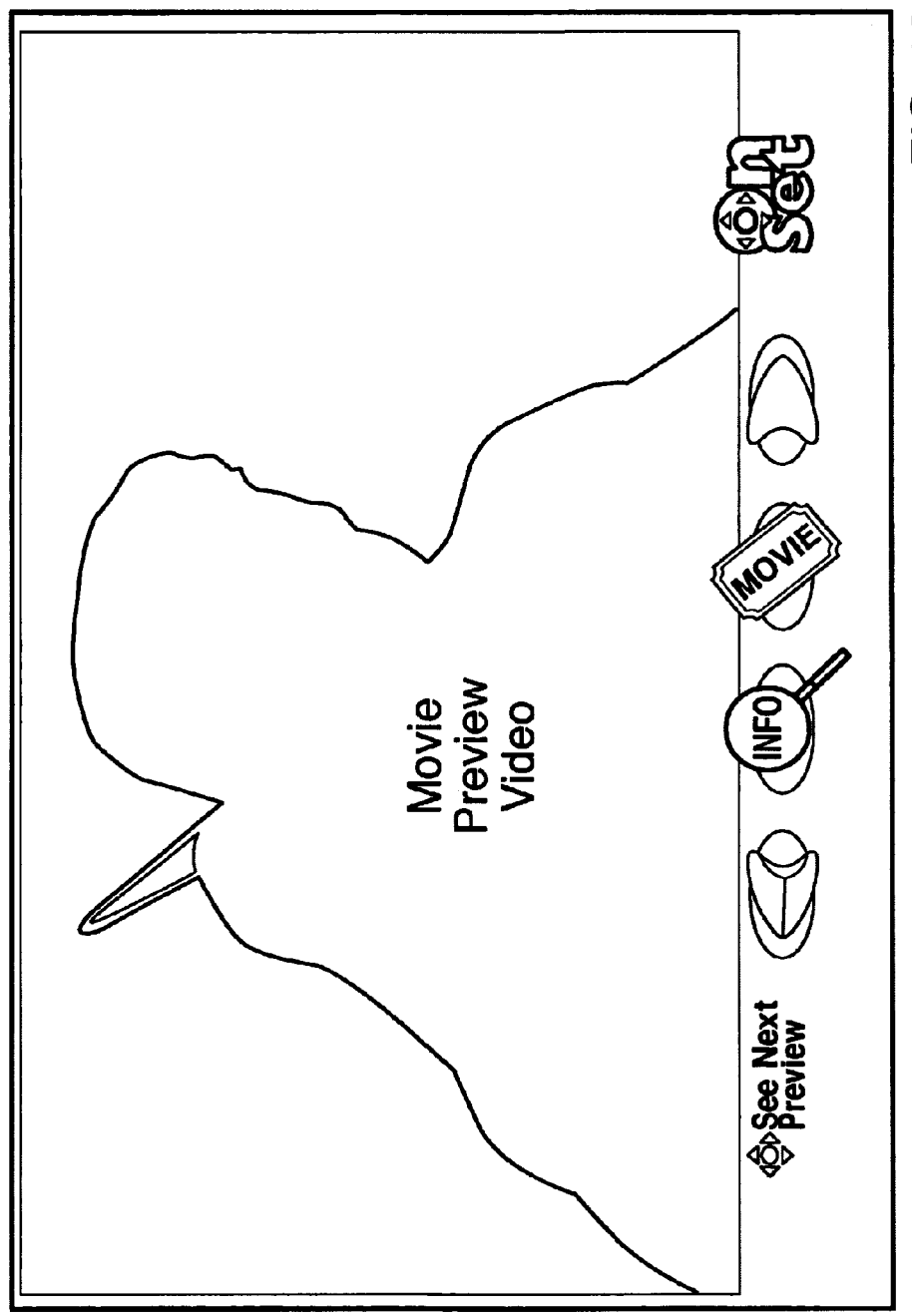
FIG. 12 depicts preview screen.
Figure 13:
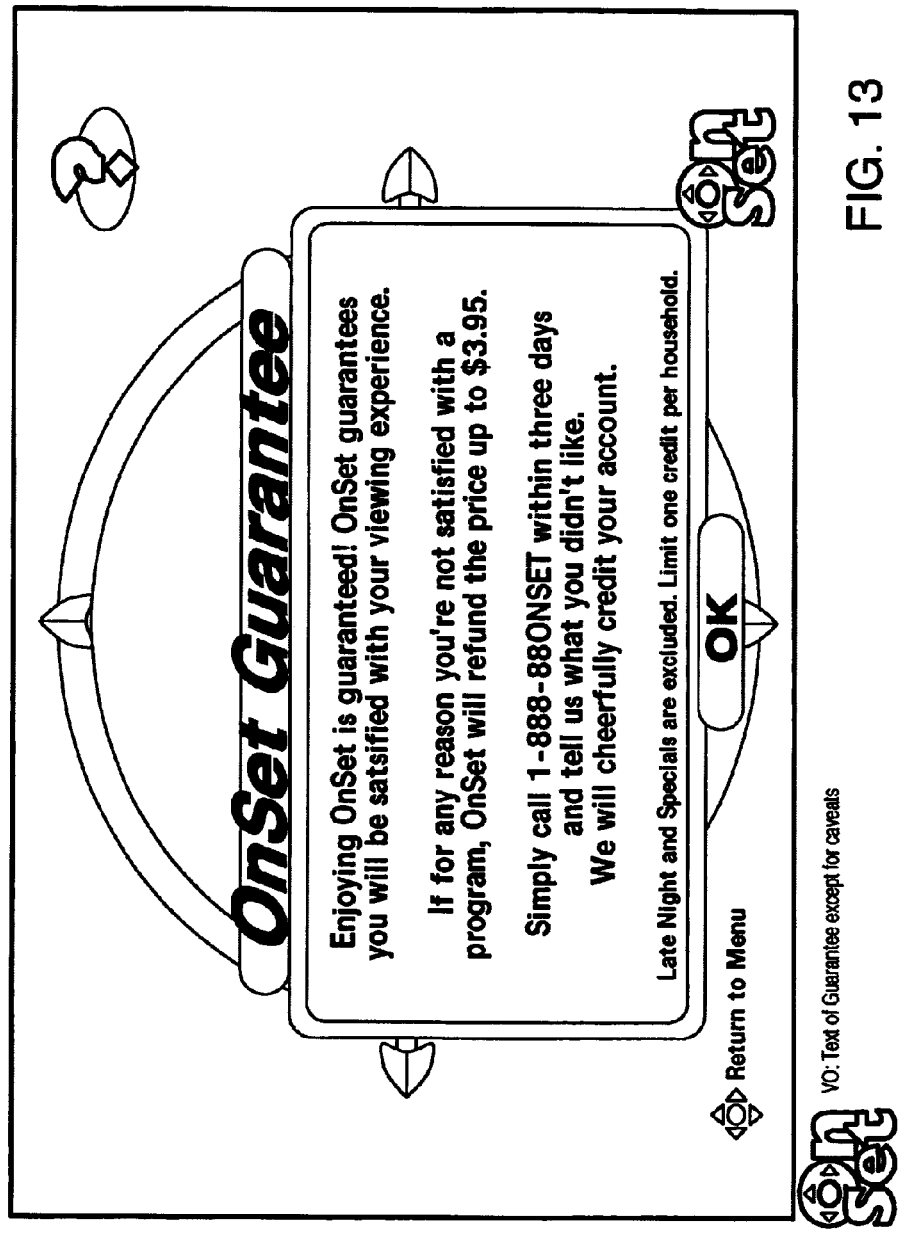
FIG. 13 depicts a guarantee screen.
Figure 14:
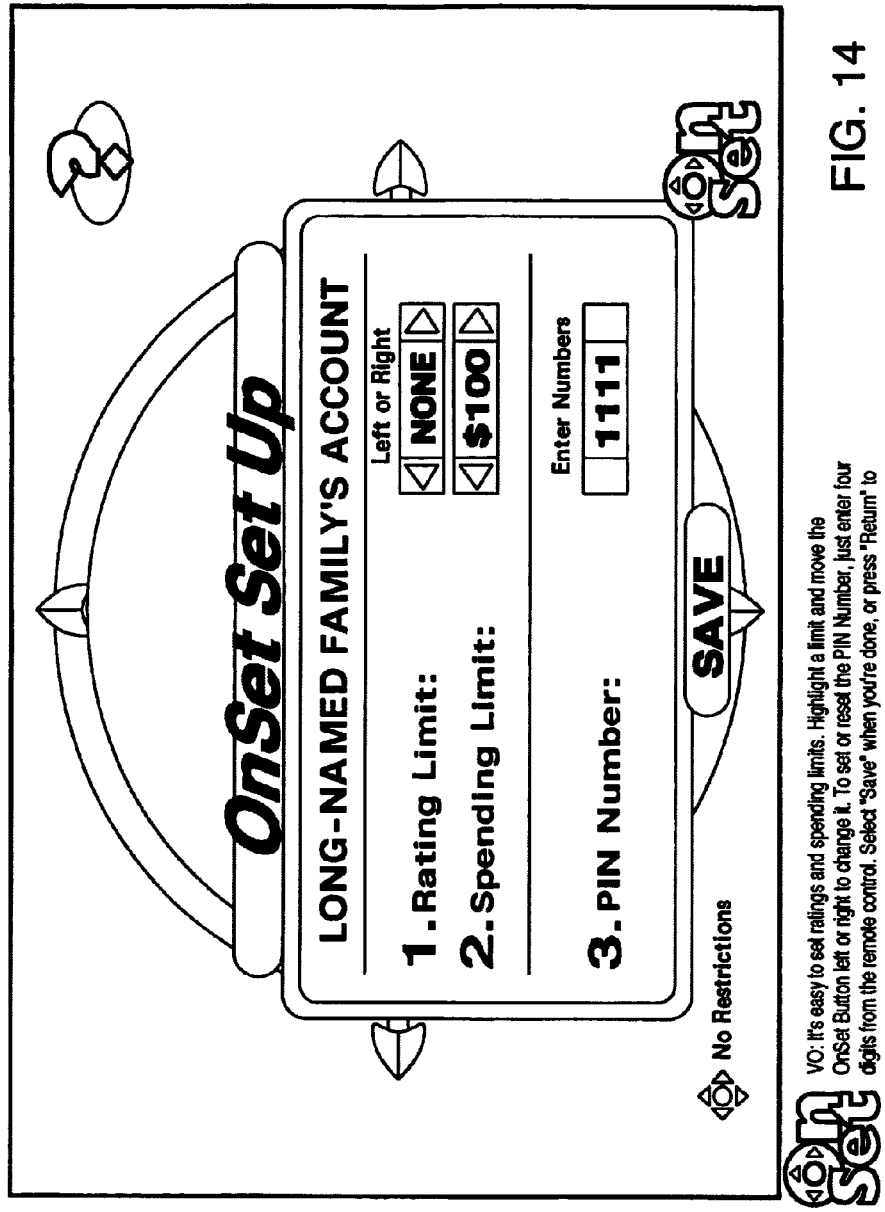
FIG. 14 depicts a set up screen.
Figure 15:
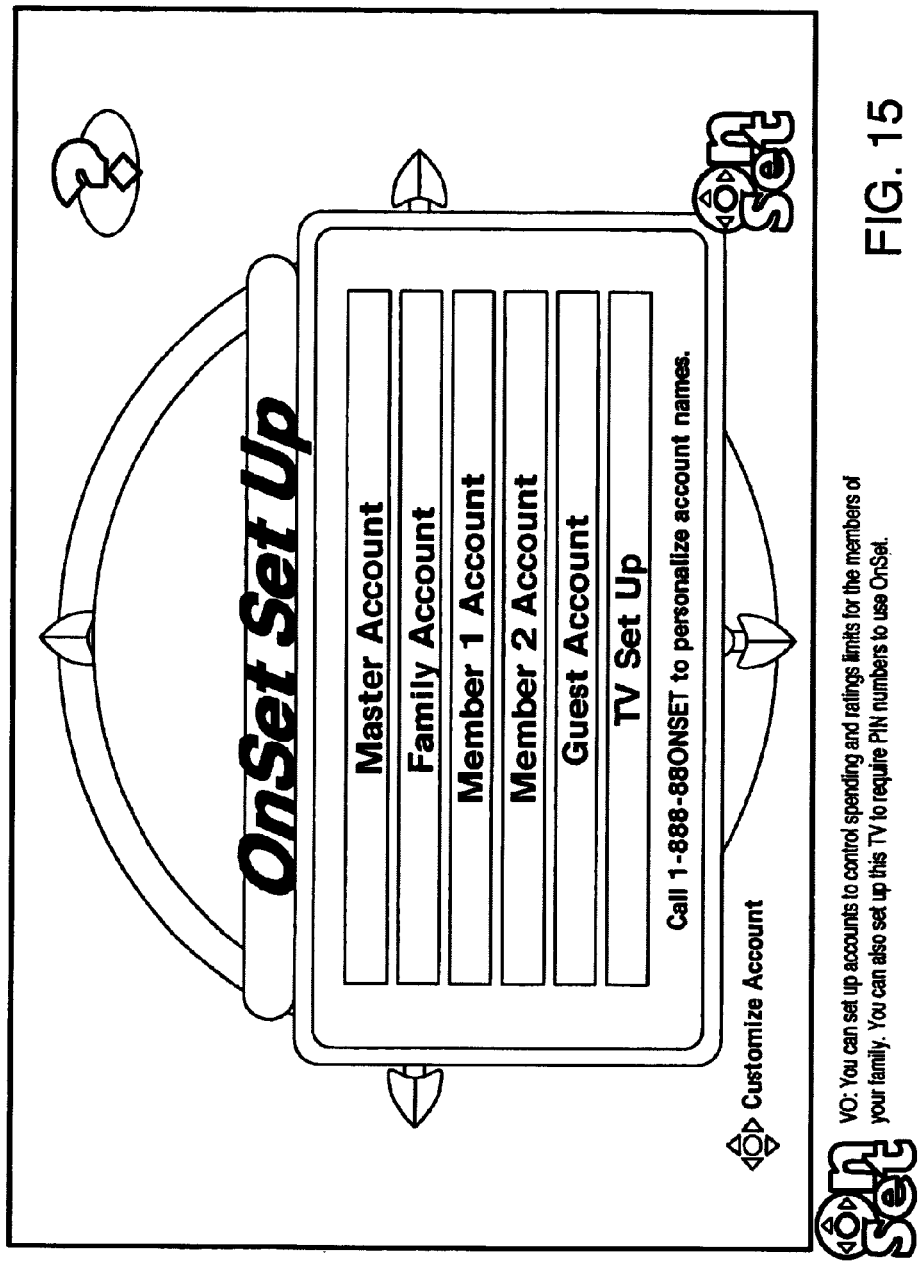
FIG. 15 depicts a set up menu.
Figure 16:
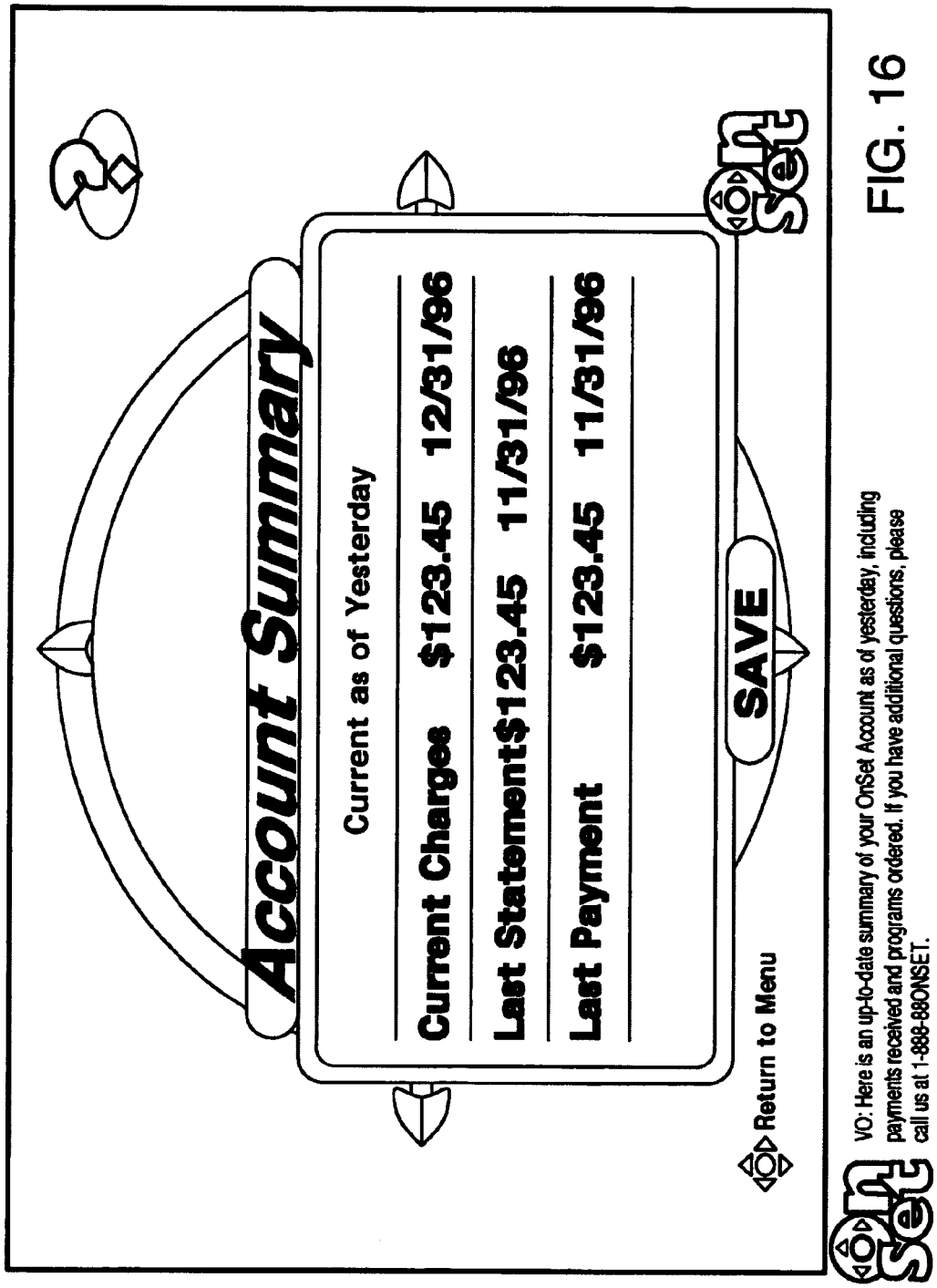
FIG. 16 depicts a account summary.
Figure 17:
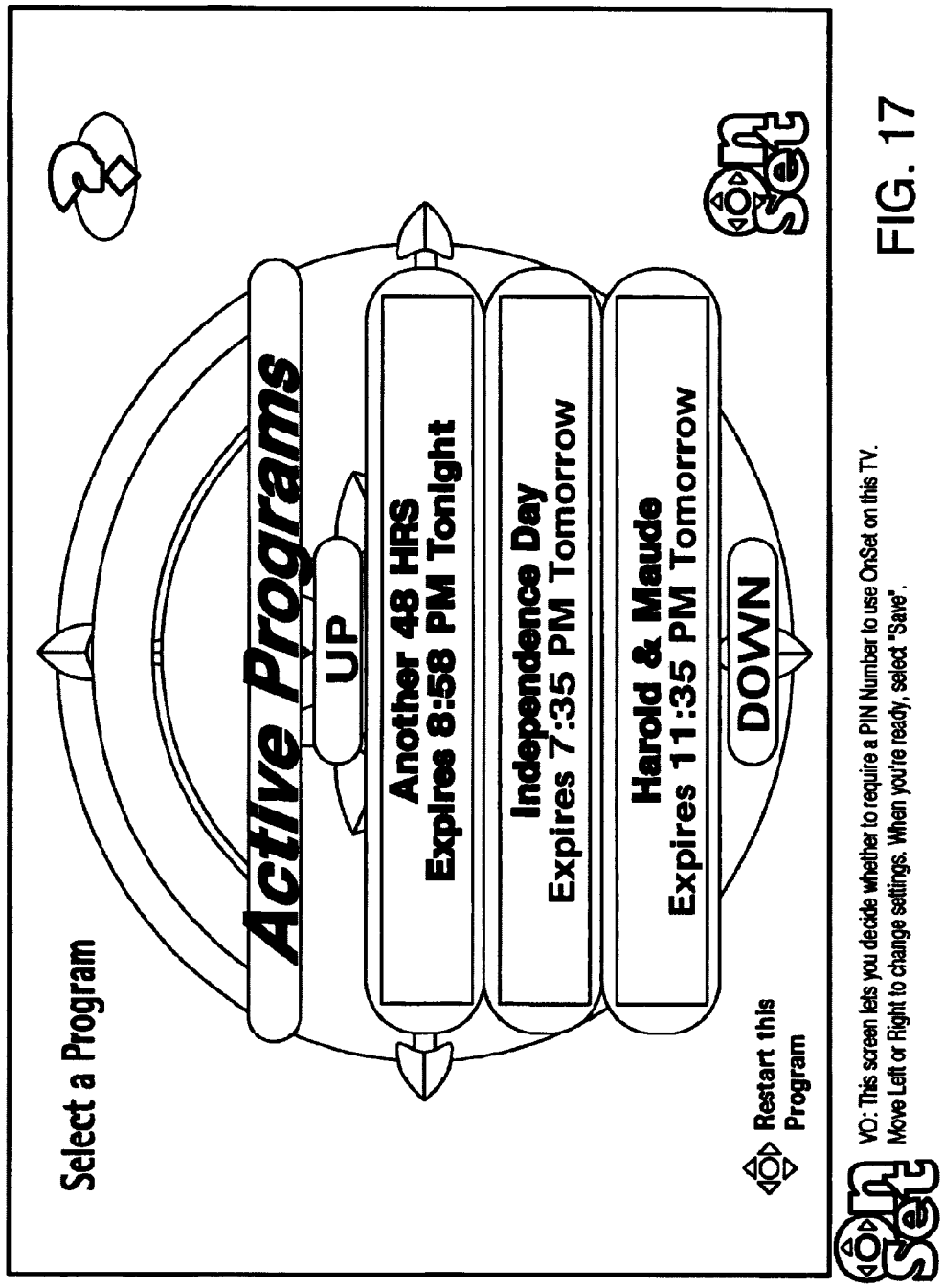
FIG. 17 depicts a active programs screen.
Figure 18:
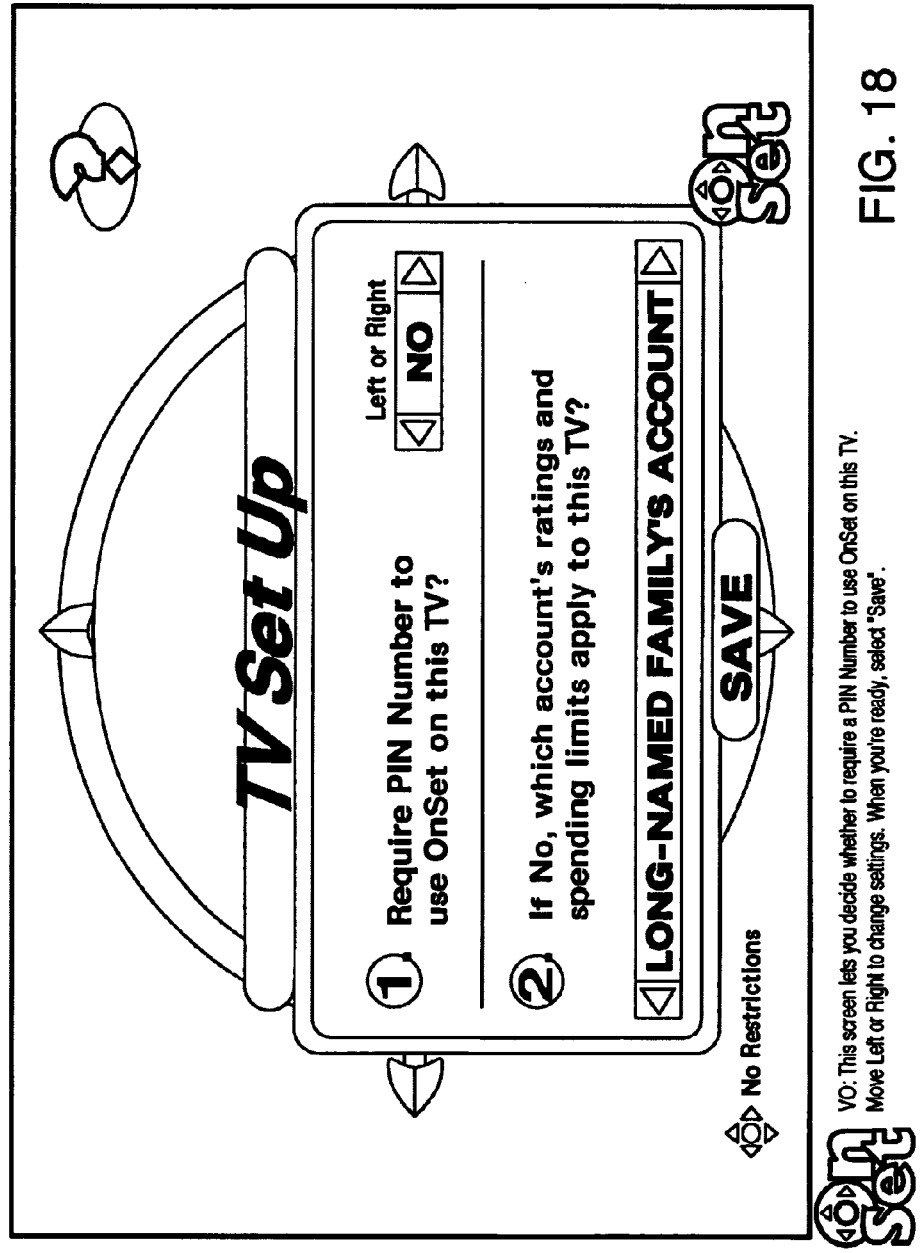
FIG. 18 depicts a TV set up menu.

FIGS. 3 and 10 depict illustrative menu imagery (a "compass" menu screen 300) used to select movies available from the information distribution system. All the information, as well as control instructions, to produce such a menu is contained in an applet downloaded from the service provider equipment. As such, the service provider equipment stores the applets in server memory such that each applet can be rapidly recalled and routed to a set top terminal for display. The applets can be broadcast to all the set top terminals, narrowcast to a subset of the set top terminals, or pointcast to any one of the set top terminals.

The illustrated menu screen 300 contains background video 302 that contains the menu structure. The background video also produces the text and other fixed graphics, e.g., the compass 304. An overlay or foreground video of typically transparent on-screen display (OSD) bitmap graphics 306 (shown in phantom proximate each user selectable graphic or icon) is positioned atop the background video 302. Typically, one region of the foreground video is highlighted to identify the present selectable menu region or icon. As shall be described below, these OSD graphics are produced and controlled by the OSD graphics processor within the video decoder in the set top terminal.

The background video comprises a video layer, while the overlay or foreground video comprises a graphics layer. The generation of both the video layer and graphics layer is controlled by a control layer. Briefly, the video layer comprises displayed video images produced using, e.g., information contained in an applet. The graphics layer comprises OSD overlay(s) including graphical objects that are associated with applets stored in either subscriber or provider equipment. The OSD overlay(s) are displayed over the video layer. The control layer comprises a command processing and logical operations layer. The control layer retrieves the applets associated with graphic layer objects selected by a user, executes the applets, and provides video information to the video layer and object information to the graphics layer.

The applet may also carry audio information that would "play" when a particular event occurred or specific menu object selected. Additionally, an animation object could be carried in the applet to allow certain objects to become animated when selected.

Generally, when a user selects a particular icon, the graphic object in the overlay plane is altered to de-emphasize or emphasize the icon or the video underlying the graphic object. In other words, the object is altered from one state to another state to facilitate the emphasis/de-emphasis of a particular region of the menu.

In one embodiment of the invention, when a user selects a highlighted icon, the OSD graphic proximate that icon is immediately altered to acknowledge the selection. The alteration is typically a change of color of the transparent overlay such that the icon "glows". To effectuate this OSD alteration, each menu field represented by the region is defined by a pair of linked lists. One pair of linked lists in the menu is always active, i.e., there is always some region of the screen that is highlighted.

Alternatively, the OSD graphics may produce an opaque overlay that is made transparent when the region containing the overlay, or some other region, is selected. As such, the underlying video that lies beneath the overlay is revealed. Such a mask and reveal process enables the video to contain regions of imagery that are revealed upon selection, where these regions provide the user with recognizable and enjoyable information generally relating to the selection that was made or generally providing an enjoyable transition to the next screen. Furthermore, the mask and reveal process can be used to periodically mask and reveal certain imagery without the subscriber selecting any regions. This function may be used to merely provide a graphical enhancement to the display, i.e., emphasis and de-emphasis of particular menu regions.

The applet logic responds to the user commands entered through the remote control by activating different linked lists (i.e., moving a starting link pointer), or by adding, removing, or changing the mix of regions in the active list. The applet logic also tells the CPU which command sequence terminates the applet and which response to send to the video session manager. The applet logic contains a table of command sequences that are identified with specific coordinates defining the field locations on the menu.

The function of the navigator is generated through the use of Navigator descriptor files. These files are used as the basis for construction of all navigator applet screens. A navigator descriptor file defines specific bitmap icons to be used, their physical location on the navigator menu screen, and their interactions with the subscriber's remote control actions. The navigator asset builder software program uses the navigator descriptor files to generate the final pseudo MPEG bitstream that is sent to the set top terminal. The asset builder reads the bitmaps as defined by the navigator asset builder and combines them with the appropriate control information also contained in the navigator descriptor files.

The navigator descriptor files are written in an HTML like language syntax specifically designed for this application. Each definition type starts with an angle bracket "<" immediately preceding the definition name. The definition type ends with an angle bracket, a forward slash "</" and then the definition name. Definitions can be nested. The navigator description file includes the following type definitions:

REGION: Lists all of the bitmaps that reside within an individual region on the screen, their specific locations within the region, and palette specific information for each bitmap.

PALETTE: Defines a palette of one or more colors.

BUTTON: Defines a control that appears as one or more previously defined bitmaps on the subscriber's TV and can cause actions to take place (primarily messages sent upstream) when the subscriber presses the SELECT button on the remote control while the button is highlighted.

LIST: Defines a control that consists of one or more bitmaps (usually a rectangular region of constant color) that is overwritten with TEXT sent from the upstream process and rasterized onto the region. Generally the text remains visible and the background colors change per subscriber selection.

STATIC: Defines a control that consists of one bitmap (usually a rectangular region of constant color) into which upstream text is rastorize and made visible no matter what the subscriber selects with the remote control.

EDIT: Defines a control that consists of one bitmap (usually a rectangular region of constant color) into which user entered text (as in numbers from the remote control are rasterized. The text generally remains visible for that entire applet. The background color changes as the subscriber selects or unselects the edit region. Edit controls also can exhibit the behavior that require a predefined number of characters to be entered by the subscriber through the remote control before any other buttons or controls can be actuated.

ACTION: Messages that are formatted and sent upstream via the back channel when the subscriber presses the SELECT button while the corresponding ACTION control is highlighted.

Figure 7:
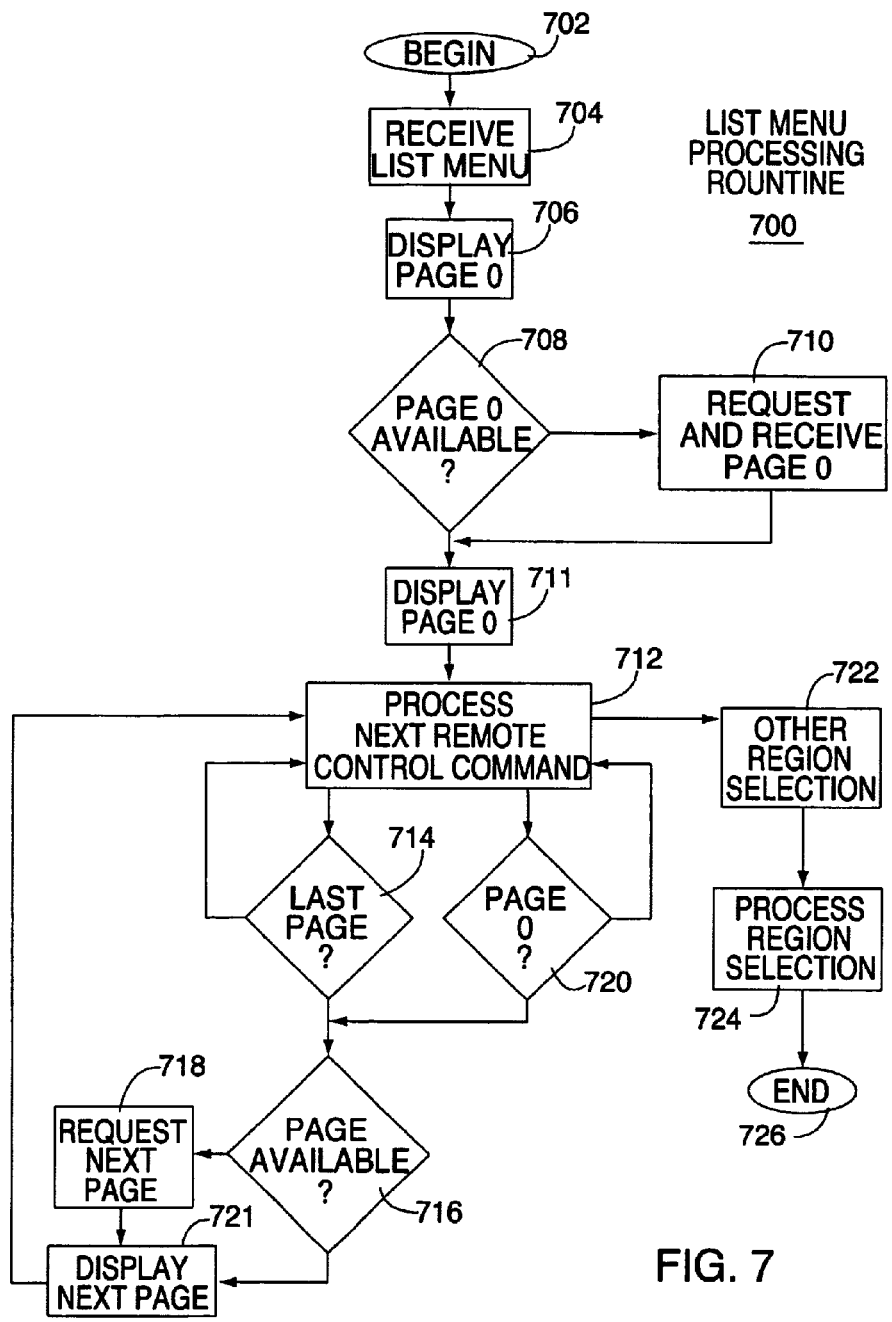
FIG. 7 depicts a flow diagram of list information processing routine.
Figure 19:
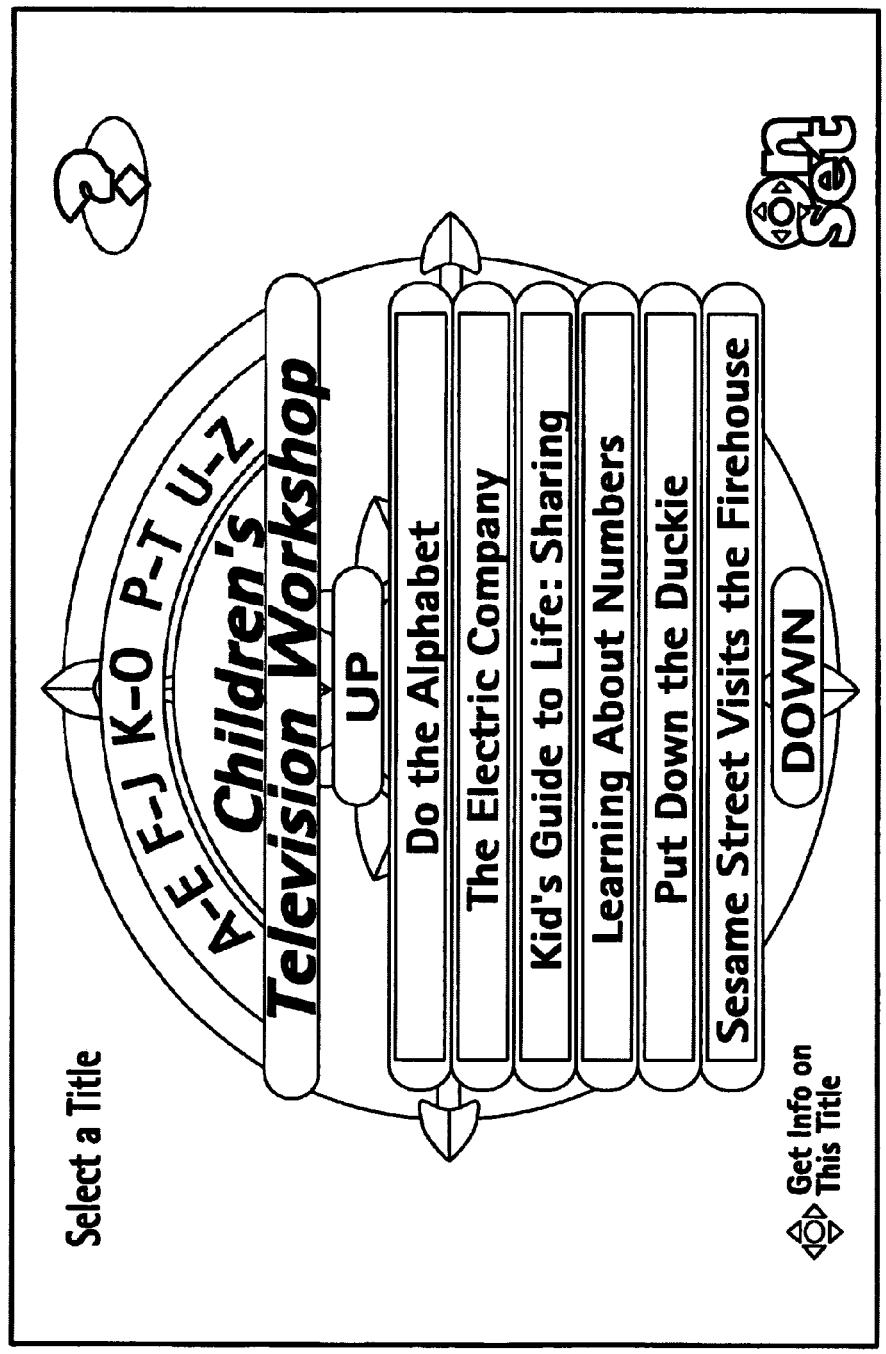
FIG. 19 depicts a list menu.

For example, a Navigator Descriptor File for a List Screen (LAZ) such as that which appears in FIG. 19 and whose operation is discussed with respect to FIG. 7 is structured as follows:

```
<SCREEN name=LAZ>
    # # # # # # # # # # # # # # # Define Regions
    # # # # # # # # # # # # # # # # # # # # # # #
    <REGION MIX=3>
        <BMP NAME=UpLevelInfo FILE=/ms/bmp/up_mme~2
        X=88 Y=398 BG=0>
    </REGION>
        <BMP NAME=UpInfo FILE=/ms/bmp/listup~2 X=88
        Y=398 BG=0>
    </REGION>
    <REGION MIX =3>
        <BMP NAME=Chop FILE=/dv/chopstr X=555 Y=394
        BG=14>
        <BMP NAME=ChopInfo FILE=/ms/bmp/chop_m~2
        X=88 Y=398 BG=0>
    </REGION>
    </REGION MIX=2>
        <BMP NAME=Up FILE=/ms/bmp/list~1 X=287
        Y=166 BG=0>
        <BMP NAME=line1 FILE=dv/line X=163 Y=205
        BG=1>
        <BMP NAME=line2 FILE=/dv/line X=163 Y=236
        BG=1>
        <BMP NAME=line3 FILE=/dv/line X=163 Y=267
        BG=1>
    </REGION>
    </REGION MIX=2>
        <BMP NAME=line4 FILE=/dv/line X=163 Y=298
    BG=1>
    </REGION>
    </REGION MIX=2>
        <BMP NAME=line5 FILE=/dv/line X=163 Y=329
        BG=1>
        <BMP NAME=line6 FILE=/dv/line X=163 Y=360
        BG=1>
        <BMP NAME=ChopTop FILE=/dv/chopsttp X=555
        Y=355 BG=14>
    </REGION>
    <REGION>
        <BMP NAME=AEInfor FILE=/ms/bmp/list_a~1
        X=88 Y=392 BG=0>
    </REGION>
    <REGION>
        <BMP NAME=FJInfo FILE=/ms/bmp/list_f~1 X=88
        Y=392 BG=0>
    </REGION>
    <REGION>
        <BMP NAME=KOInfo FILE=/ms/bmp/list_k~1 X=88
        Y=392 BG=0>
    </REGION>
    <REGION>
        <BMP NAME=PTInfo FILE=/ms/bmp/list_p~1 X=88
        Y=392 BG=0>
    </REGION>
    <REGION>
        <BMP NAME=UZInfo FILE=/ms/bmp/list_u~2 X=88
        Y=392 BG=0>
    </REGION>
    <REGION>
        <BMP NAME=Down FILE=/ms/bmp/list_d~12 X=286
        Y=388 BG=0>
        <BMP NAME=DownInfo FILE=/ms/bmp/list_d~2
        X=88 Y=392 BG=0>
    </REGION>
    </REGION MIX=6>
        <BMP NAME=SAUSAGE FILE=/dv/sausage BG=14
        X=178 Y=53>
        <BMP NAME=AE FILE=/dv/ae BG=14 X=178 Y=53>
        <BMP NAME=FJ FILE=/dv/fj BG=14 X=178 Y=53>
        <BMP NAME=KO FILE=/dv/ko BG=14 X=178 Y=53>
        <BMP NAME=PT FILE=/dv/pt BG=14 X=178 Y=53>
        <BMP NAME=UZ FILE=/dv/uz BG=14 X=178 Y=53>
    </REGION>
    </REGION MIX=3>
        <BMP NAME=Help FILE=/ms/bmp helpst~1 X=555
        Y=8 BG=2>
    </REGION>
```

```
<REGION>
    <BMP NAME=HelpInfo FILE=/ms/bmp/help_9~1
    X=88 Y=392 BG=0>
</REGION>
<REGION>
    <BMP NAME=ListInfo FILE=/ms/bmp/list_t~1
    X=88 Y=398 BG=0>
</REGION>
<REGION>
    <BMP NAME=UpLevel FILE=/ms/bmp/up_mme~1
    X=274 Y=24 BG=0>
# # # # # # # # # # # # # Define Special Palettes
                                # # # # # # # # # # # # # #
<PALETTE NAME=off>
    <RGB 0 150 150 TRANSPARENT>
    <RGB 0 0 0>
</PALETTE>
<PALETTE NAME=active>
    <RGB 0 255 179>
    <RGB 0 0 0>
</PALETTE>
</PALETTE NAME=BON>
    <RGB 255 255 255 TRANSPARENT>
</PALETTE>
<PALETTE name=HighLite>
    <RGB 0 255 179>
    <RGB 0 0 0>
</PALETTE>
# # # # # # # # # # # # # # # # #
Define Controls # # # # # # # # # # # # # # #
<LISTBOX NAME=listbox ON=active OFF=off SEL-LISTSEL
FONT=0>
    <GOTO N=Up S=Down>
    <GOTO E=Chop>
    <TAB TYPE=CENTER STOP=188>
    <TAB TYPE=LEFT STOP=188>
    <ENTRY ASC=line1>
    <ENTRY ASC=line2>
    <ENTRY ASC=line3>
    <ENTRY ASC=line4>
    <ENTRY ASC=line5>
    <ENTRY ASC=line6>
    <FOCUS ASC=ListInfo ON=ListInfo>
    <ACTION MSG=SELECT>
        <FADE>
        <SENDSTRINGS LISTSEL>
    </ACTION>
</LISTBOX>
<BUTTON NAME=DOWN>
    <FOCUS ASC=Down ON=Down>
    <FOCUS ASC=DownInfo ON=DownInfo>
    <GOTO N=listbox E=Chop>
    <ACTION MSG=SELECT>
        <PGDOWN LIST=listbox>
    </ACTION>
</BUTTON>
<BUTTON NAME=Up>
    <FOCUS ASC=Up ON=Up>
    <FOCUS ASC=UpInfo ON=UpInfo>
    <GOTO S=listbox N=KO>
    <ACTION MSG=SELECT>
        <PGUP LIST=listbox>
    </ACTION>
</BUTTON>
<BUTTON NAME=UpLevel>
    <FOCUS ASC=UpLevel ON=UpLevel>
    <FOCUS ASC=UpLevelInfo ON=UpLevelInfo>
    <GOTO S=KO E=Help>
    <ACTION MSG=SELECT>
        <FADE>
        <TRANSITION DIR=U>
    </ACTION>
</BUTTON>
</BUTTON NAME=AE>
    <FOCUS ASC=SAUSAGE ON=BON>
    <FOCUS ASC=AE ON=HighLite>
    <FOCUS ASC=AEInfo ON=AEInfo>
    <GOTO S=Up E=FJ N=UpLevel>
    <ACTION MSG=SELECT>
        <SENDSTRINGS AE>
    </ACTION>
</BUTTON>
<BUTTON NAME=FJ>
    <FOCUS ASC=SAUSAGE ON=BON>
    <FOCUS ASC=FJ ON=HighLite>
    <FOCUS ASC=FJInfo ON=FJInfo>
    <GOTO S=Up E=KO W=AE N=UpLevel>
    <ACTION MSG=SELECT>
        <SENDSTRINGS FJ>
    </ACTION>
</BUTTON>
<BUTTON NAME=KO>
    <FOCUS ASC=SAUSAGE ON=BON>
    <FOCUS ASC=KO ON=HighLite>
    <FOCUS ASC=KOInfo ON=KOInfo>
    <GOTO S=Up E=PT W=FJ N=UpLevel>
    <ACTION MSG=SELECT>
        <SENDSTRINGS KO>
    </ACTION>
</BUTTON>
<BUTTON NAME=PT>
    <FOCUS ASC=SAUSAGE ON=BON>
    <FOCUS ASC=PT ON=HighLite>
    <FOCUS ASC=PTInfo ON=PTInfo>
    <GOTO S=Up E=UZ W=KO N=UpLevel>
    <ACTION MSG=SELECT>
        <SENDSTRINGS PT>
    </ACTION>
</BUTTON>
<BUTTON NAME=UZ>
    <FOCUS ASC=SAUSAGE ON=BON>
    <FOCUS ASC=UZ ON=HighLite>
    <FOCUS ASC=UZInfo ON=UZInfo>
    <GOTO S=Up W=PT E=Help N=UpLevel>
    <ACTION MSG=SELECT>
        <SENDSTRINGS UZ>
    </ACTION>
</BUTTON>
<BUTTON NAME=Help>
    <FOCUS ASC=Help ON=Help>
    <FOCUS ASC=HelpInfo ON=HelpInfo>
    <GOTO W=UZ>
    <GOTO S=Chop>
    <ACTION MSG=SELECT>
        <FADE>
        <TRANSITION DST=HLS DIR=D>
    </ACTION>
</BUTTON>
<BUTTON NAME=Chop>
    <FOCUS Chop ASC=Chop ON=Chop>
    <FOCUS ChopInfo ASC=ChopInfo ON=ChopInfo>
    <FOCUS ChopTop ASC=ChopTop ON=ChopTop>
    <GOTO W=Down>
    <GOTO N=Help>
    <ACTION MSG=SELECT>
        <FADE>
        <TRANSITION DST=MME DIR=J>
    </ACTION>
</BUTTON>
</SCREEN>
```

Figure 8:
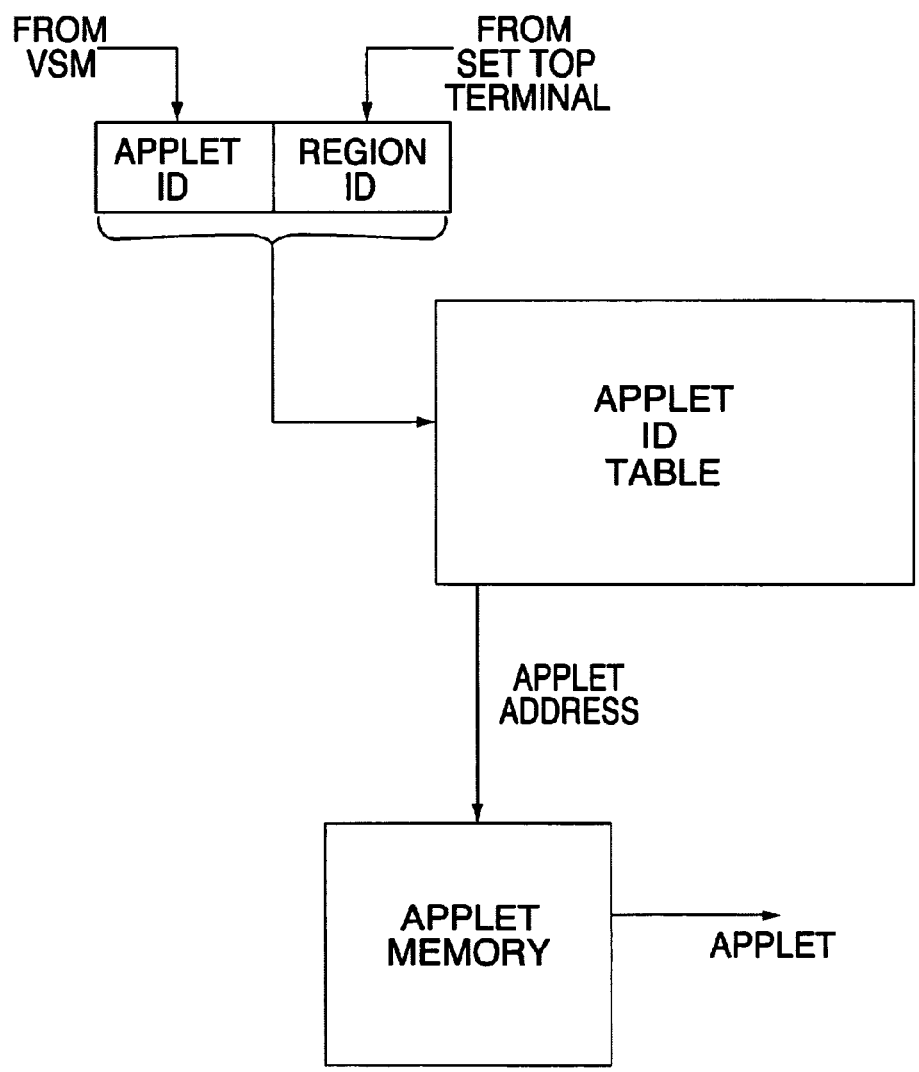
FIG. 8 depicts a flow process for retrieving and transmitting an applet.
Figure 9:
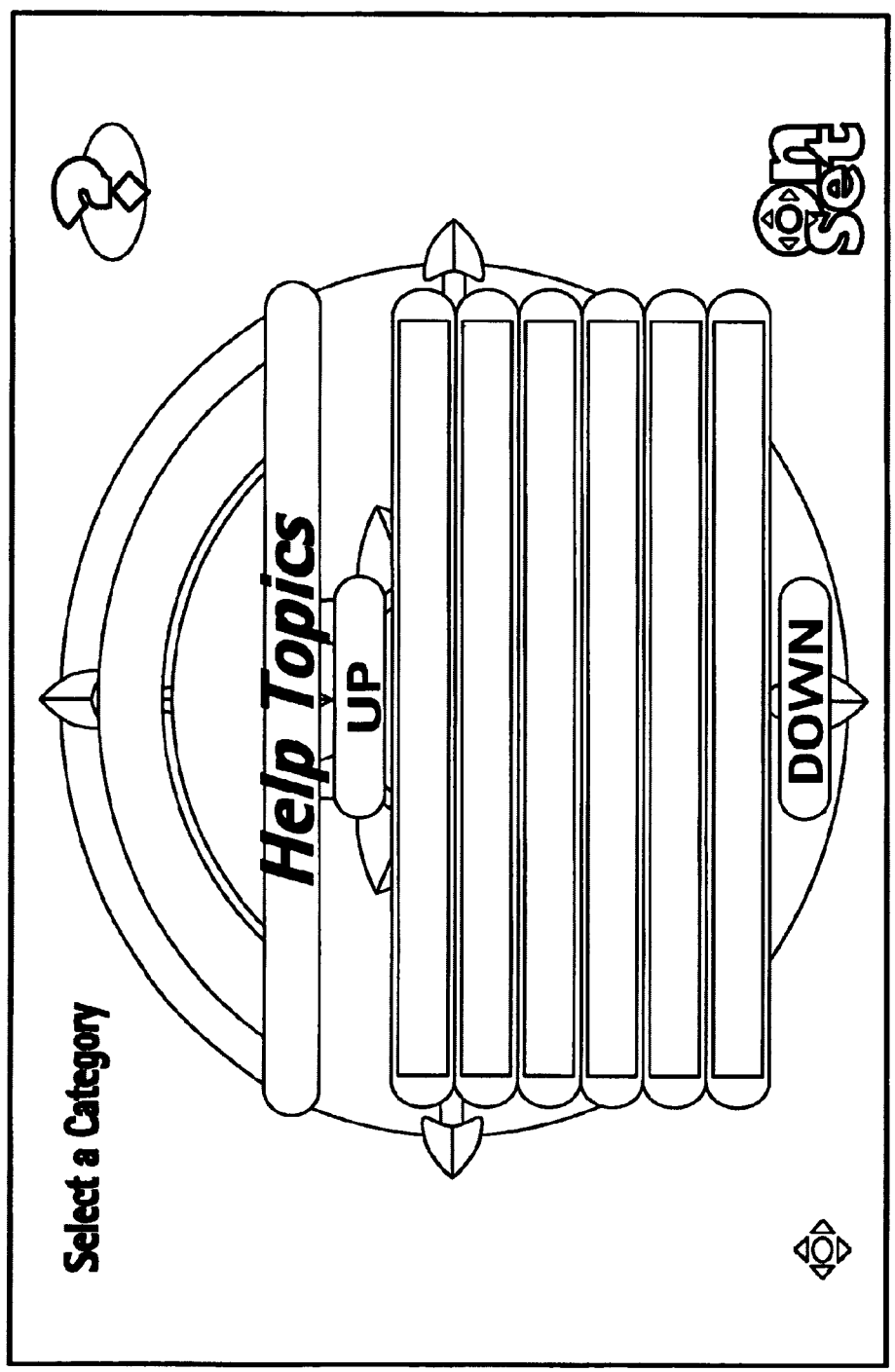
FIG. 9 depicts a help menu.

As shown in FIG. 8, an address (region ID) identifying the selected region is transmitted to the video session manager. The video session manager concatenates the region address with an address of the applet within which the region selection was made. The concatenated address is used to identify an entry (an applet ID) in an applet table. This applet ID indicates the applet that is to be sent to fulfill the subscriber's request. The AID may also identify a movie or other multimedia information that is to be transmitted. The specific applet routine identified by the applet ID is recalled from memory and forwarded to the set top terminal for execution. The set top terminal then performs a function identified by the applet, e.g., decode the signals with assets (applet decoding), decode signals without assets (decode applet without any controls except return), decode movie from beginning, or decode movie from middle. As such, the set top terminal does not perform any high level functions, the terminal, in most instances, merely functions as a video decoder and command interpreter.

Figure 4:
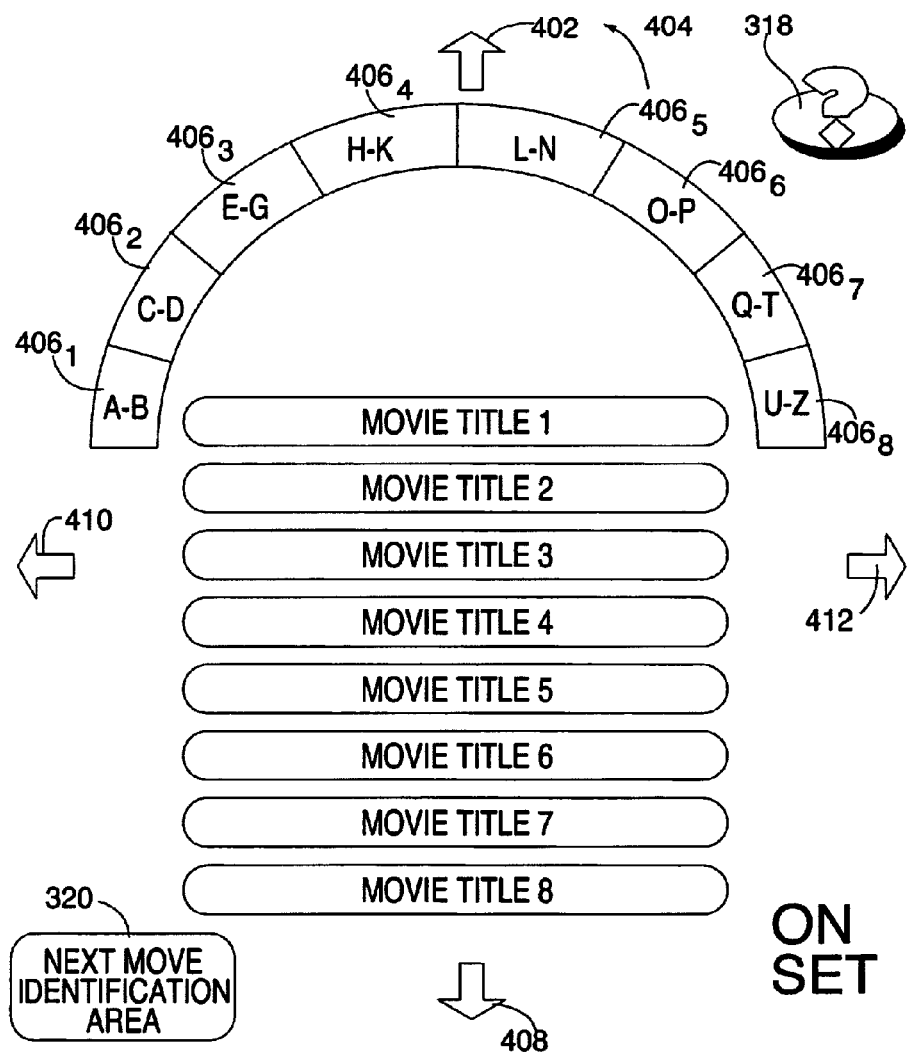
FIG. 4 depicts a second illustrative "list" menu display containing a text list of selections.

Returning to FIGS. 3 and 10, each menu is linked to other menus as a linked list such that selection of a particular icon results in another applet being downloaded and another menu being generated. In addition to textual icons, the menu 300 contains a "compass" 304. This compass forms a "spatial mnemonic" through which a subscriber navigates through the various menu screens. For example, the east and west arrows (310 and 312) link to menus that are conceptually lateral to the present menu. Such menus that are lateral to, for example, the movie explorer menu 300 are new movie promotional clips and a special interest list menu. The north arrow 314 links to a previous menu. The south arrow is generally non-functional in the particular menu shown. Other icons on the menu 300 include a help icon 318 and a current highlighted region description area 320. As such, area 320 provides a short description of the presently highlighted region, e.g., the explanation of "Movies A–Z" is shown. Selecting region 324 executes an applet that produces a "list menu", as described with respect to FIGS. 4 and 19 below. Other icons link to short multimedia "clips". For example, the "Coming Soon" icon 322 links to a series of promotional clips or graphics that advertise movies that will soon be available. The "On Set" icon 316, when selected, leads back to the initial menu into the navigator or some other high level point in the navigator tree. The "On Set" icon appears on every menu to provide an direct link to a higher level of the navigator from any menu.

For example, selecting the "Movies A–Z" textual icon 324 links to an alphabetical menu (see menu 400 of FIGS. 4 and 19) that presents an alphabetical list 402 of all the available movies. The arcuate menu region 404 contains a plurality of alphabetic ranged segments 406$_n$ (where n is an integer value) that, when selected, presents a menu list containing the movie titles in the selected alphabetic range. The subscriber can then scroll through the alphabetical list 402 using the up arrow icon 402 to move to a previous page of movies and the down arrow 408 to move to a following page. Manipulating the joystick will sequentially highlight the movie titles until a desired title is highlighted. Selecting a name of a movie causes that movie to be sent to the set top terminal for presentation. The left and right arrows 410 and 412 move to similar lists in parallel menus, e.g., moving from an alphabetical list of comedies may move to an alphabetical list of dramas and so on. When an arrow (or any icon) is highlighted, a move identifier area 320 presents a short description of the menu that will be presented if that icon is selected.

Prior to completing a transaction for purchase of a movie or other service, other applets are downloaded to the set top terminal which form menus stating the price of the selection, confirming the selection, showing a preview prior to purchase, and the like.

An illustrative set of particular menus used by the system are shown in FIGS. 9–19. These menus include: a help menu (FIG. 9) containing a list of help topics; a compass menu (FIG. 10) as discussed above; a movie information screen (MIS) (FIG. 11) containing a movie abstract as well as a preview button, buy button, "on set" button and help button; a movie preview screen (FIG. 12) containing a region for a video preview to be played, arrow buttons to next/previous preview, buy button, information (MIS) button and on set button; guarantee screen (FIG. 13); set up menu (FIG. 14) containing fields for entering a rating limit, a spending limit and a PIN as well as a save button and an on set button; a list menu (FIG. 15) illustrating set up information; an account summary screen (FIG. 16); an session summary menu (FIG. 17) containing the active programs associated with present PIN; a TV set up menu (FIG. 18); an alphabetical listing menu (FIG. 19) as previously described. At the bottom of each of the screens depicted in FIGS. 13–18 is printed an example of the audio voice over (VO) that is reproduced as each screen is displayed.

Figure 5:
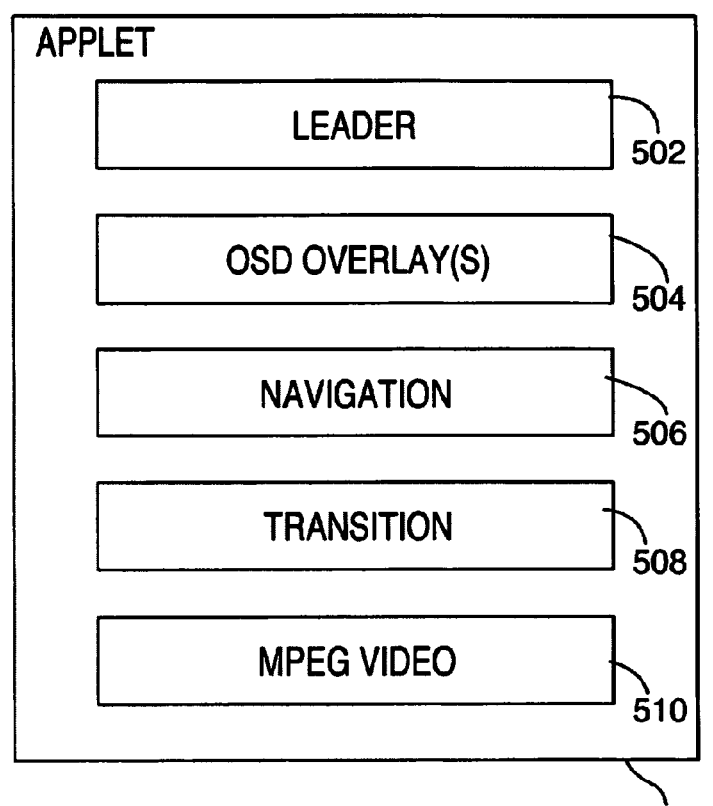
FIG. 5 depicts a schematic illustration of the content of an applet.

FIG. 5 depicts a schematic diagram of the contents of the portion of an applet 500 that is transmitted via the information channel to implement each of the menus. Separately, the descriptor file is transmitted via the command channel (or alternatively the information channel) such that the functions of the applet can be implemented. A descriptor file for each menu may be transmitted and stored (or prestored) in the set top terminal. Specifically, the applet 500 contains a leader 502, OSD overlay graphics 504, navigator control instructions 506, transition signal 508, and compressed (e.g., MPEG) background video 510. As such, upon selection of an icon in a given menu, an applet for the linked menu is transmitted from server to the set top terminal. That applet carries the background video and the OSD overlays as well as all instructions necessary to implement the functions of the menu. The video session manager maintains the linked list (menu tree) of applet interrelations such that when the set top terminal sends a command via the back channel, the video session manager interprets the command and causes the server to send the appropriate applet. The applet begins with the leader 502 which is followed by the OSD overlays 502 which are decoded by the OSD decoder while the remainder of the applet is being processed. The navigation control instructions 504 facilitate overlay activation and transition control. The transition signal is generally a packet that identifies the end of the navigator information and the beginning of the new MPEG video. Lastly, the new MPEG video signal is sent and presented in combination with the OSD graphics. At some point in the menu structure, the subscriber selects a movie title and the video session manager causes the server to send the selected movie.

Figure 6A:
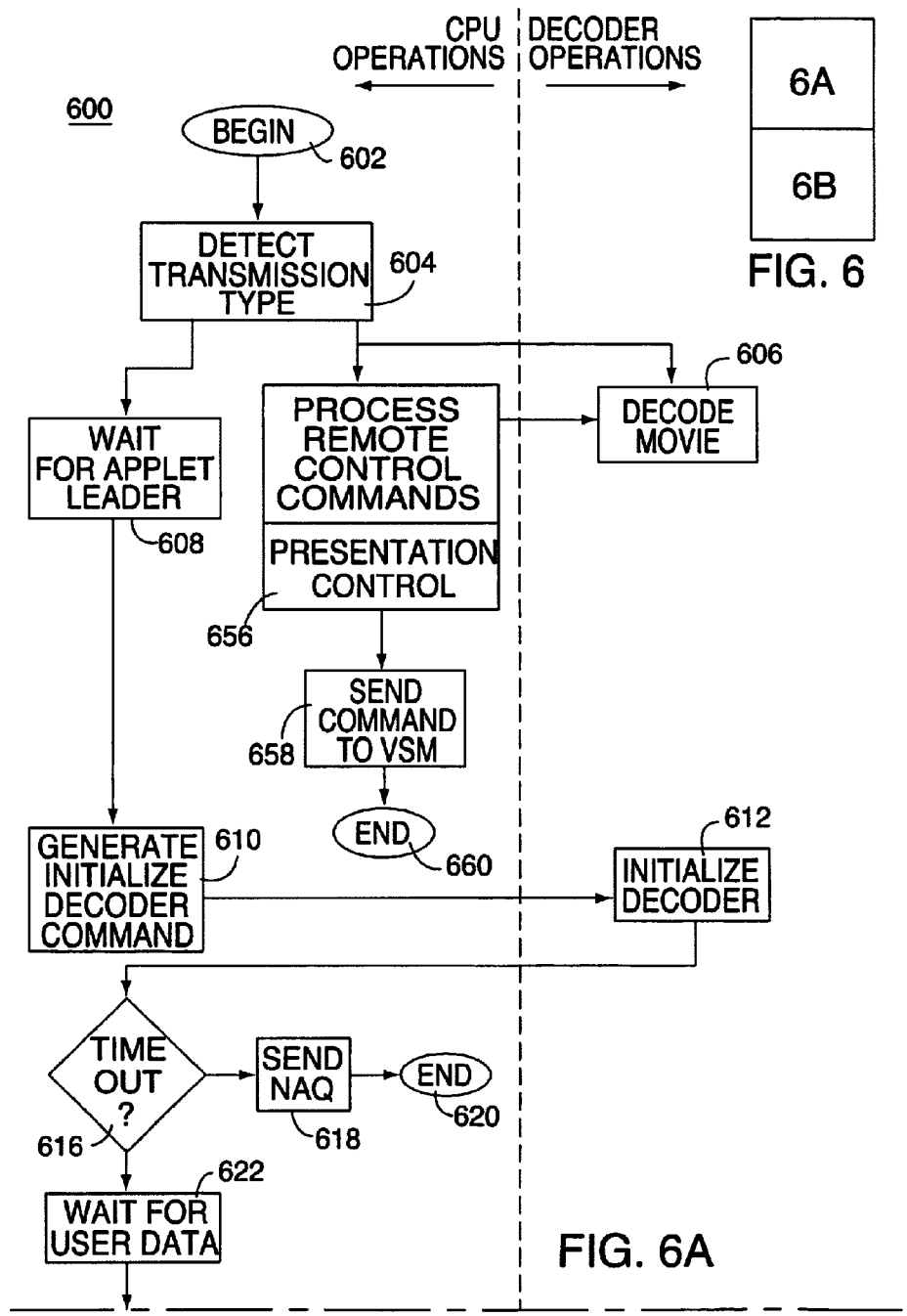
FIGS. 6A and 6B, taken together, depict a flow diagram of an applet transmission and execution routine.
Figure 6B:
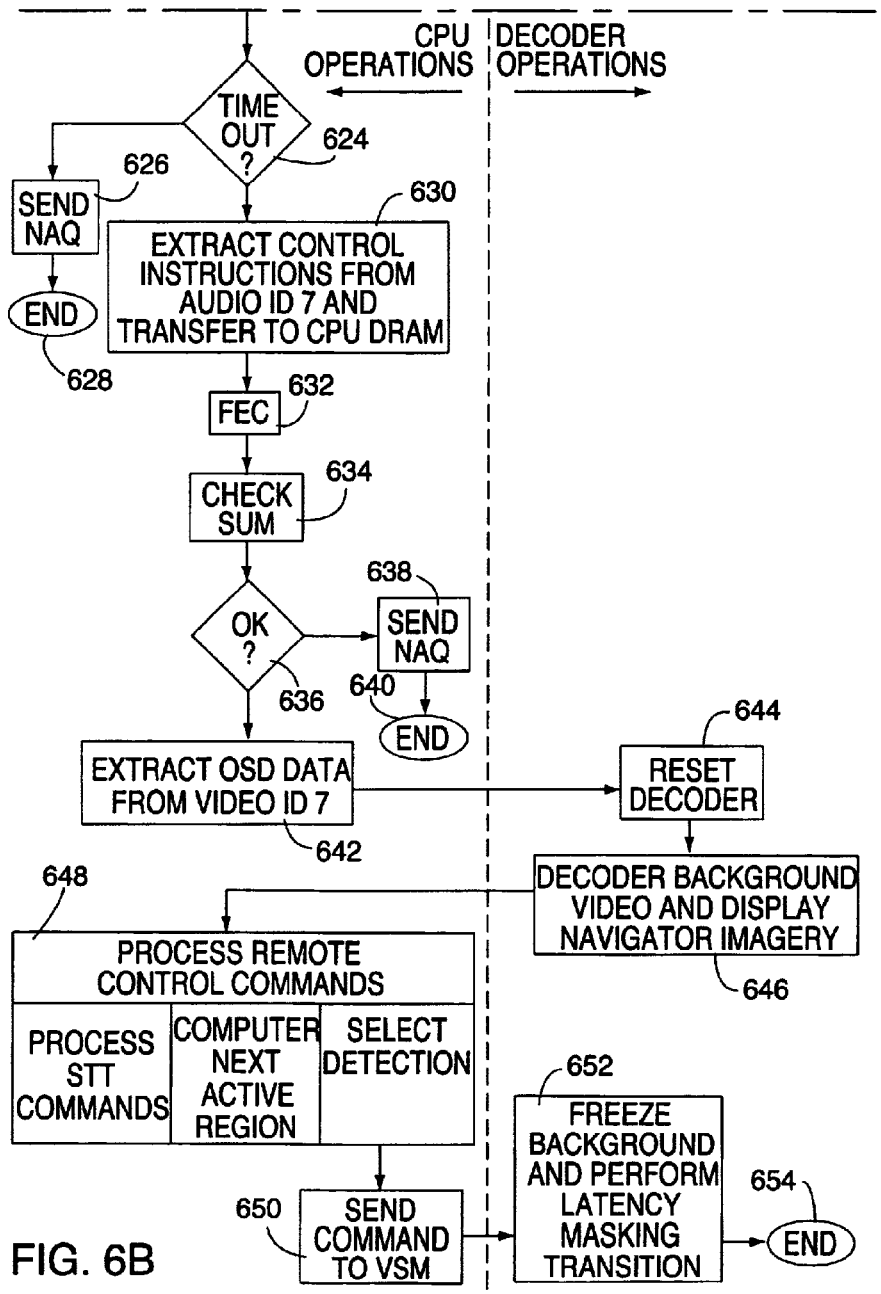

FIG. 6 depicts the appropriate alignment of FIGS. 6A and 6B. These figures, taken together, depict an applet transmission and execution routine 600. The diagram depicts the portion of the routine handled by the CPU on the left and the portion of the routine handled by the OSD decoder on the right. The CPU primarily handles control layer functions, while the OSD decoder primarily handles graphics layer functions. The routine 600 begins with step 602 and proceeds to step 604. The CPU detects, at step 604, the type of transmission being received. Specifically, the CPU detects whether the transmission is a movie or a navigator applet. An applet is identified by the video packet sequence containing a particular stream identification code, e.g., VIDEO ID 7. If the transmission is a movie, the video decoder begins, at step 606, decoding the movie. The movie decoding process is controlled by the CPU via step 656. At step 656, the CPU processes any movie presentation control commands generated by the remote control. As such, the CPU sends, at step 658, the presentation control command to the video session manager to facilitate changing the presentation. The routine ends at step 660.

If, at step 604, an applet is detected, the routine awaits, at step 608, for the applet leader. At step 610 and 612, the set top terminal CPU initializes the decoder and sets certain buffer pointers. In particular, the applet contains a video stream having VIDEO ID 7 carrying the OSD graphics, an audio stream having AUDIO ID 7 carrying the applet control instructions, and a video stream carrying the background video. To process these applet components, the CPU must store the OSD graphics and the instructions in special memory locations to avoid interference with the normal operation of the video decoder. As such, at steps 610 and 612, the CPU initializes the decoder's VIDEOID stream ID to 7 and sets the video stream select (VSS) bit. The OSD data is delimited by a user packet that indicates that the OSD data download is complete. Further, the CPU sets a video input buffer pointer to an OSD region of the decoder DRAM. As such, all video packets having an ID of 7 are routed to the OSD region of the memory. Similarly, the set top terminal CPU initializes the decoder AUDIOID stream ID to 7 and sets the audio stream select enable (ASE) bit. Also, the audio input buffer pointer is set to a temporary memory location of the decoder DRAM. This storage location is temporary because the instructions carried in the AUDIO ID 7 packets are ultimately copied to the CPU DRAM for execution.

At step 616, the routine queries whether an excessive amount of time has elapsed between detection of an applet and reception of the applet. If the query is affirmatively answered, the set top terminal sends, at step 618, a negative acknowledgment (NAQ) signal through the back channel to the video session manager. The routine ends at step 620. Upon receiving the NAQ signal, the video session manager will resend the applet.

If the query at step 616 is negatively answered, the routine proceeds to step 622. At step 618, the set top terminal begins receiving the applet, i.e., the CPU detects the user data packet. At step 624, the routine queries whether an excessive amount of time has elapsed between detection of a user data packet and reception of the data. If the query is affirmatively answered, the set top terminal sends, at step 626, a negative acknowledgment (NAQ) signal through the back channel to the video session manager. The routine ends at step 628. Upon receiving the NAQ signal, the video session manager will resend the applet.

At step 630, the control instructions within packets carrying AUDIOID 7 are extracted from the packets and stored in the CPU DRAM. At step 632, forward error correction is performed on the extracted bits. Additionally, at step 634, a check sum is created to ensure that the extracted control instructions are correct. At step 636, the CPU queries whether the check sum was correct. If the check sum is correct, the routine proceeds to step 642. However, if the query is negatively answered, the routine sends a NAQ to the video session manager and ends at step 640 to await retransmission of the applet.

At step 642, the OSD data within packets having a VIDEOID 7 are extracted from the packets and stored in the OSD region of the decoder DRAM. The payload of these packets is one or more bitmap images to be used by the applet. The OSD images are loaded directly into the start of the OSD data space. Subsequent packets (for VIDEOID 7) contain consecutive portions of the OSD image(s). An OSD image compiler leaves space at the beginning of each packet for actual MPEG synchronization codes. To indicate the end of the OSD transmission, a "user data" packet of up to 96 bytes in length is inserted into the video stream between the OSD packet stream and the background video stream.

At step 644, the CPU resets the video decoder to enable it to receive the background video transmission. At step 646, the video decoder begins to decode the background video and display that navigator imagery to the subscriber. The OSD overlays are also processed by the decoder and displayed in accordance with the descriptor file for the menu being displayed.

At step 648, the routine processes navigator commands from the remote control. These commands include all those associated with an applet with assets as well as an applet without assets. Note that an applet without assets has a single return button displayed for selection. Thus, the joystick is disabled, but the select function operates in the same manner as an applet with assets. At step 648, the CPU processes the three types of navigator commands: local set top terminal commands such as on/off, volume, channel selection; joystick directional vectors; and region selection. The vectors are processed to determine which region should next be highlighted. When a selection is made, the CPU sends, at step 650, a command to the video session manager to facilitate the transmission of a movie or applet.

At step 652, to facilitate a transition, the routine freezes the background video and prepares the set top terminal for the next applet or video transmission. In addition, the CPU executes a latency masking process as disclosed in commonly assigned U.S. Pat. No. 5,781,227, issued Jul. 14, 1998. The applet ends at step 654.

Although many OSD graphics are sent within the VIDEOID 7 stream through the forward information channel, some OSD graphics are transmitted to the set top terminal through the command channel. Specifically, so-called "list screen" data is sent through the command channel. This data contains a textual list of characters to be used in a menu and is transmitted in ASCII form at the beginning of an applet transmission. The CPU converts the ASCII character list into OSD bitmap images and stores those images for subsequent use.

FIG. 7 depicts a flow diagram of a list information processing routine 700 for generating a list menu such as those depicted in FIGS. 4, 9, 15 and 19. The routine is executed by the CPU upon requesting a list menu. The routine begins at step 702 and proceeds to step 704. At step 704, the CPU receives a list menu from the service provider. The menu applet contains an instruction for the CPU to display page 0 of list text that forms the menu. The list text is an ASCII page of text. The page 0 request is processed at step 706. At step 708, the routine queries whether page 0 is available in the CPU cache. If the query is negatively answered, the CPU requests the page 0 text from the service provider and awaits its arrival. If page 0 is available in the cache, the CPU retrieves and uses the cached page to generate the text menu (at step 711). The CPU converts the ASCII text into one or more OSD bitmap images using an EEPROM based font and kerning table. The CPU stores the OSD bitmap in the CPU DRAM. As the OSD lists are displayed, the CPU moves the necessary OSD graphic images to the video decoder OSD memory. The list menu is in the form of that shown in FIG. 4.

Such display is performed on a paginated basis. At step 712, the CPU monitors the remote control for a new selection, e.g., up arrow, down arrow, and select a particular region. If a down arrow is selected, the routine proceeds to step 714. At step 714, the routine queries whether the display is presently showing the last page of the list menu. If the query is affirmatively answered, the routine returns to step 712. If the query at step 714 is negatively answered, the routine proceeds to step 716 to determine whether the next subsequent page is cached. If the page is not cached, the CPU requests, at step 718, the next page from the service provider. The new page is used to form and display a list menu at step 721. Similarly, if an up arrow is selected, the routine checks if the previous page is in cache. If the page is in cache, the CPU uses the cached page. However, if the page is not available, the CPU requests the service provider to send the page.

If, at step 712, the routine detects that a region other than an up or down arrow is selected, the routine proceeds to step 722. At step 724, the routine processes the region selection in the same manner as described above for processing and displaying a new menu that is identified by the region selected. The routine ends at step 726.

The method and apparatus of the present invention provide an interactive menu structure (navigator) for an information distribution system such as a video-on-demand system. The navigator provides an enjoyable, interactive experience with full motion background video and active graphics that indicate when a selection is made by altering their appearance. All this functionality is brought to the set top terminal within an applet for each displayed menu. Consequently, the set top terminal does not require an expensive processor nor a large amount of memory. As such, the invention allows the set top terminal in an information distribution system to remain relatively inexpensive.

The method and apparatus of the present invention lend themselves to the generation and display of alternative menu structure: an interactive program guide. The interactive program guide is described below in the context of an interactive information distribution system as described above. However, it will be readily apparent to those skilled in the art that the teachings of the present invention may be advantageously utilized in other interactive information distribution systems.

Figure 20:
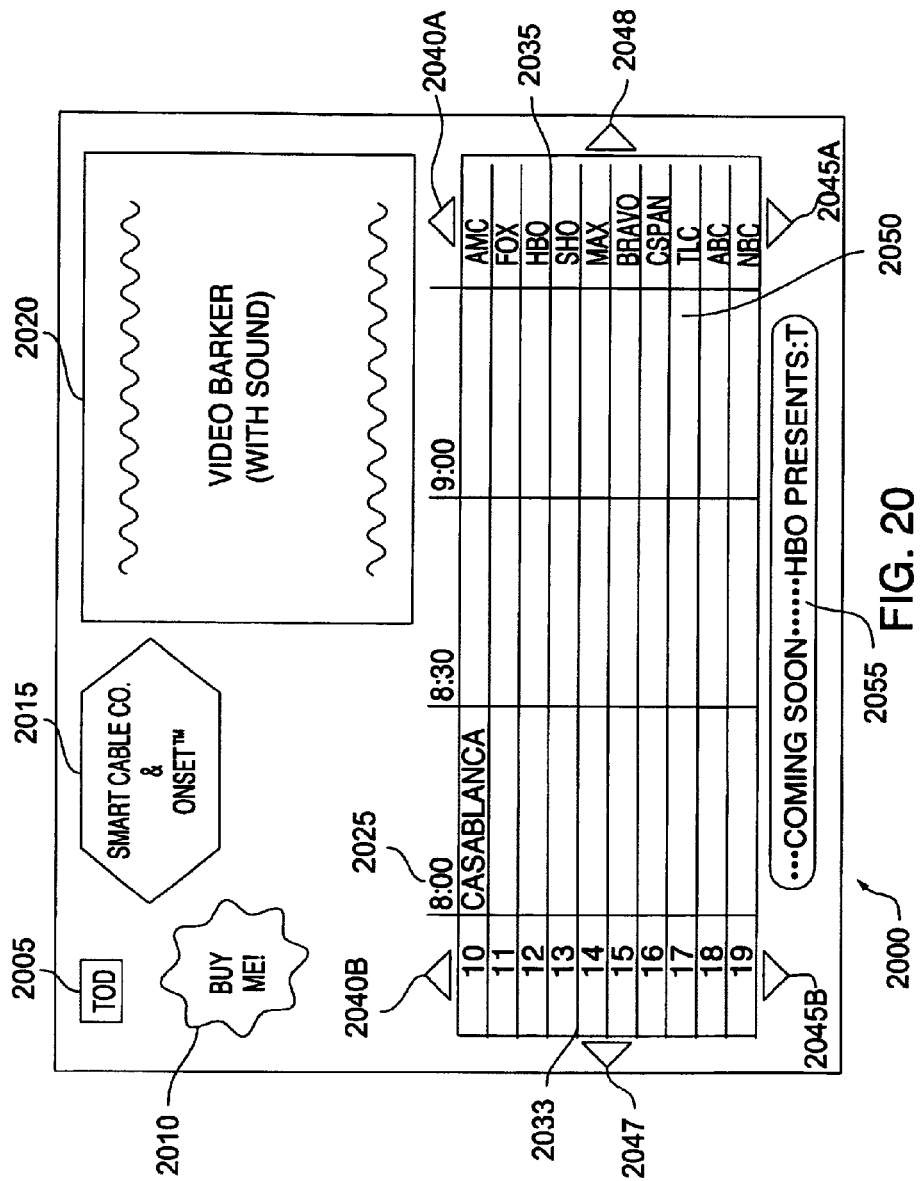
FIG. 20 depicts a display screen of an interactive electronic program guide (IEPG)

FIG. 20 depicts a display screen 2000 of an interactive electronic program guide (IEPG) that forms an alternative menu structure to that of the Navigator or a complimentary menu structure to that of the Navigator. For instance, the IEPG may contain an object that launches the navigator, the navigator may contain an object the launches the IEPG, or the IEPG and navigator may coexists on the same system or exist independently. Either, or both, of the menu structures can be broadcast, narrowcast, or pointcast to the users.

Specifically, the exemplary interactive program guide screen 2000 comprises a time of day/date (TOD) indicator 2005, a promotional "splash" object 2010, a cable system or provider logo 2015, a video barker 2020 (and associated audio barker), a program time indicator 2025, a channel number indicator 2033, a channel identifier (text or logo) 2035, a pair of channel display decrement objects 2040*a* and 2040*b*, a pair of channel display increment objects 2045*a* and 2045*b*, a temporal increment object 2048, a temporal decrement object 2047, a program grid 2050 and a scrolling promotional banner 2055. The interactive program guide display 2000 is displayed on a television screen or other video presentation device in, e.g., the home of a subscriber to a cable television or other information distribution system utilizing the interactive electronic program guide.

The interactive program guide display 2000 is comprised of a video layer and a graphics layer. That is, the IEPG display 2000 is primarily formed at a central or head end location in, for example, a cable television system or video on demand system. Video information representative of each of the objects or elements previously identified (2005–2055) is generated at the central processing location or head end, and transmitted as part of a video stream. Thus, the actual display parameters (i.e., the size, shape, color, position and other visual parameters) associated with each object are entirely controlled at a central location.

Those on screen objects or elements that may be modified by the subscriber are identified by, e.g., a remote control device cooperating with the set top terminal. Such object identification causes the locally stored and/or locally generated graphical overlay objects to be altered in a manner that identifies the objects on the screen. That is, each manipulable object or element is associated with a corresponding graphical overlay element (e.g., an x-y coordinate box or other element). The overlay element (by changing its opacity, color, look, and the like) selectively emphasizes or de-emphasizes an object on the screen in response to manipulation of the remote control unit.

Upon receiving a "select" entry from the remote control unit, the set top terminal transmits, via a back channel, information that identifies the selected object to the head end. It is important to note that changing the emphasis of an object or element to identify the object is performed entirely at the local level within the subscriber equipment. That is, there is no change in the actual video information transmitted by the head end to the subscriber. Only the graphical overlay layer on the display is changed to emphasize or de-emphasize an object.

The user interaction manipulations are those manipulations that are intended by the user to change a particular emphasis or overlay highlighting or overlay position on the screen such that objects are identified. By contrast, other manipulations (e.g., selection of an emphasized object) may be intended to change video information displayed on the screen such as the position (temporal or channel) of the program grid, selection of a promotional object and the like.

The interactive program guide display 2000 (i.e., the video layer provided by the head end) depicts a program offering of 10 channels within a 1.5 hour time interval.

Channel options in the IEPG can represent any combination of programming offered from a wide range of sources, including but not limited to, over-the-air broadcast, cable broadcast, satellite broadcast, local programming, ad insertion apparatus and can include the full range of pay channels, pay per view (PPV), video on demand (VOD), near video on demand (NVOD), internet service, interactive gaming, interactive shopping, "free" programming, etc. Channel numbers can be virtual in nature, and they can be remapped in either the set top box or the head end equipment to correspond to the service being delivered. Delivery of PPV, NVOD, VOD, interactive gaming, interactive shopping, internet, video classified ads, and other services can be integrated into this system in a two-way cable environment through the use of cable modem technologies or other back-channel methods known to those familiar in the art of enabling such services in a network environment. This invention may further be used to enable pay television services, such as subscription services like HBO®, Showtime®, etc., in a two-way cable environment through the use of cable modem technologies or other back-channel methods known to those familiar in the art of enabling such services in a network environment. Since there are 24 hours in a day, 16 video streams are required to depict 24 hours of program offerings of 10 channels within a single IEPG. These 16 video streams may be included within a single transport stream. Thus, a user desiring to view the next 1.5 hour time interval (e.g., 9:30–11:00) may activate a "scroll right" object 2048 (or move the joystick to the right when a program within program grid 2050 occupies the final displayed time interval in any row of cells). Such activation will result in the controller of the STT noting that a new time interval is desired. The video stream corresponding to the new time interval is then decoded and displayed. If the corresponding video stream is within the same transport stream (i.e., a new PID), then the stream will be immediately decoded and presented. If the corresponding video stream is within a different transport stream, then the different transport stream is extracted from the broadcast stream and the appropriate video stream is decoded and presented. If the necessary broadcast stream is within a different broadcast stream than was previously used, then the different broadcast stream will be tuned, the different transport stream will be extracted from the different broadcast stream and the appropriate video stream will be decoded and presented.

Similarly, a user interaction resulting in a prior time interval or a different set of channels will result in the retrieval and presentation of an appropriate video stream. It is important to note that each extracted video stream is associated with a common audio stream. Thus, the video/audio barker function of the program guide is continuously provided, regardless of the selected bitstream that forms the IEPG.

The above described user manipulations, and the resulting change in presented video streams, are all within the same "context" of the program guide. That is, the context of the program guide (i.e., the contextual model) described thus far is the "program guide" context in which user manipulations to the guide are used to modify the attributes of the program grid. In the event of a user selection of a highlighted or emphasized program within the program grid, the context changes to a "program selected" context, in which the video and audio information streams associated with a selected channel are retrieved and presented to the user. The selection information is coupled to the head end via the back channel. The head end then couples the appropriate streams to the user, if they are not already being received by the user. In the program selection context, the user may have selected a broadcast stream (i.e., a network feed), a narrowcast stream (a regional or local information feed, such as a community or public access channel) or a pointcast stream (such as a pay per view event or interactive shopping channel). Consequently, selection of an emphasized object causes an event to occur in the head end, where the event may be tuning to an analog channel, tuning to a digital channel and/or launching any other resident capability in the head end (service provider equipment).

After the user has finished viewing or otherwise utilizing a selected program, the operating context of the STT/program guide will return to the program guide context. That is, any pointcast or narrowcast "session" that was initiated due to the selection of a program will be torn down upon completion of that program. The user will be returned to the broadcast streams associated with the program guide of the present invention. The concept of contextual shifting and the implications for bandwidth utilization are described in more detail below. Briefly, the invention operates to maximally utilize the bandwidth within an interactive information distribution system by allocating system functionality to system components (i.e., server side and subscriber side). The system provides a common interactive program guide produced by a head end and transmitted to multiple subscribers via a broadcast (i.e., non-specific subscriber delivery) technique. Such a system requires less expensive transmission techniques than those used for pointcast (i.e., subscriber specific delivery) transmission techniques.

This system can further be extended to implement conditional access by arranging bitmap information in different data blocks according to types of access allowed. Processing of this information is performed at the head end where a series of descriptors are developed for each on-screen area capable of receiving emphasis. Part of the descriptors contain entitlement "locks" mapping access entitlement to on-screen areas capable of displaying emphasis. At the set top box, a series of "keys" exist that map to those channels the user is entitled to view. If one of the keys "fits" any of the locks, the bitmap set linked to the key may receive on-screen emphasis at the set top box.

Figure 21:
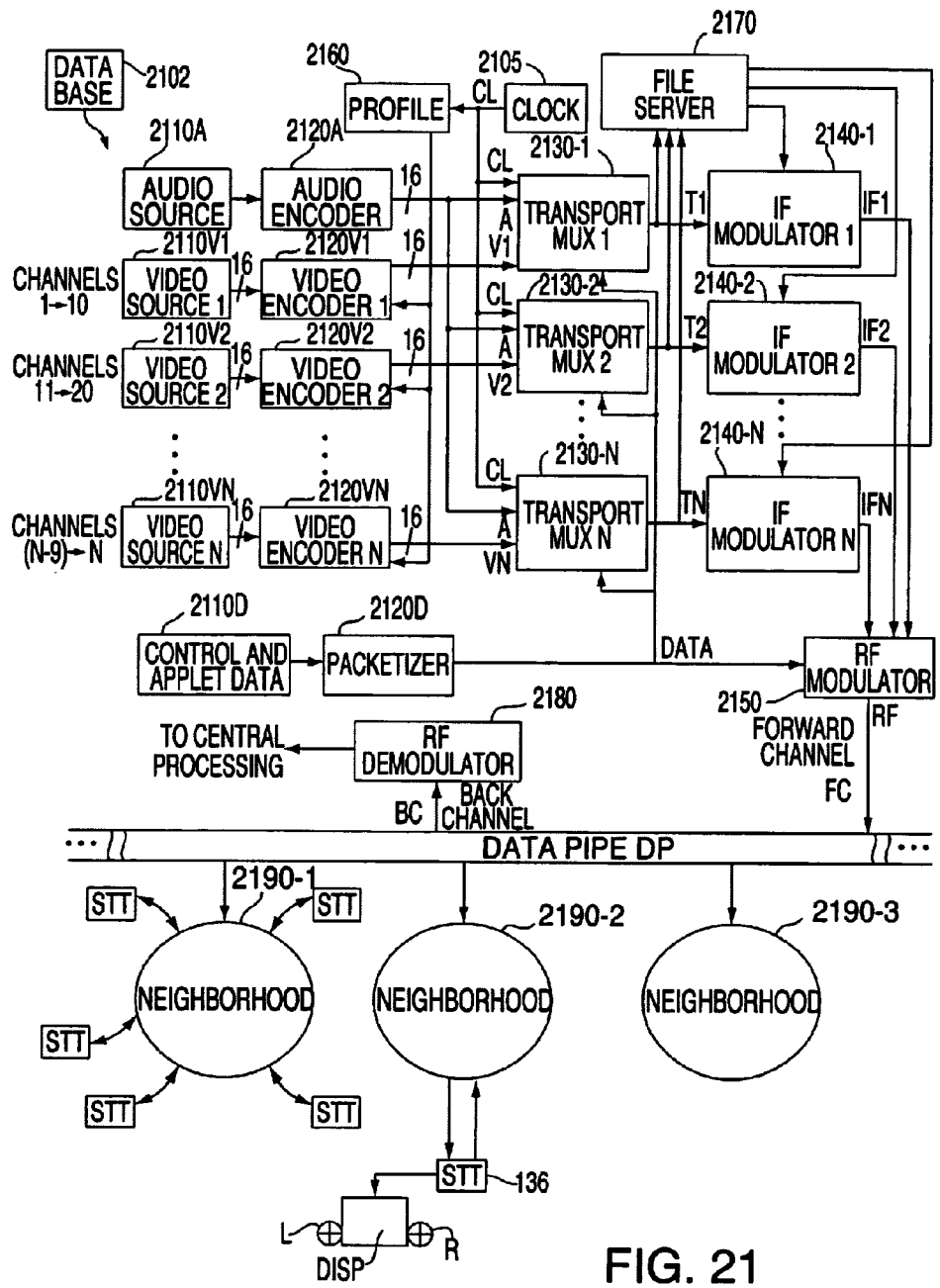
FIG. 21 depicts a high level block diagram of an interactive information distribution system.

FIG. 21 depicts a high level block diagram of an interactive information distribution system that is adapted to encode a plurality of IEPG displays. Specifically, FIG. 21 depicts an interactive video information distribution system directed towards providing a plurality of video information streams and an associated audio information stream suitable for use in the interactive electronic program guide described above with respect to FIG. 20.

The head end processing portion 2100 comprises an audio source 2110A, a plurality of video sources 2110V1 through 2110VN, an audio encoder 2120A, a plurality of video encoders 2120V1 through 2320VN, a plurality of transport multiplexers 2130-1 through 2130-N, a plurality of intermediate frequency (IF) modulators 2140-1 through 2140-N, a radio frequency (RF) modulator 2150, a video profile module 2160, a file server 2170, a clocking source 2105, an RF demodulator 2180.

Audio source 2110A provides an audio information stream, illustratively an audio information stream associated with the audio visual barker 2020 of the interactive program guide display 2000 of FIG. 20. The audio information stream is coupled to an audio encoder 2120A, where it is encoded into a standard compressed audio format, such as Dolby AC3 or another appropriate format. The encoded audio stream A is coupled to each of the transport multiplexer units 2130-1 through 2130-N.

The first video source 2110V1 provides, illustratively, 16 video information streams to video encoder 2120V1. Each of the 16 video streams is suitable for providing the video information necessary to support the interactive program guide display 2000 of FIG. 20. Specifically, it is noted that in the exemplary program guide 2000 of FIG. 20 up to ten channels may be displayed at one time. Thus, each of the video information streams includes information sufficient to display a program guide screen comprising a 10 channel group of channels. In one embodiment of the invention, each of the 16 video streams coupled to the video encoder 2120 comprises information sufficient to provide all video layer information for a single channel group, e.g., channels 1–10. In the case of only one of the 16 video streams being used, the output of the video encoder 2120 comprises a single encoded video stream (which will be subsequently included in a single transport stream). In the case of more than one of the 16 video streams being used, the output of the video encoder 2120 comprises more than one (up to 16) encoded video streams (all of which will be subsequently included in a single transport stream). It will be noted that 16 video streams represent 24 hours of programming for a single channel group in the case of 1.5 hour program groupings).

All the generated video streams are temporally aligned in terms of data (i.e., streams depicting different channels or different times are aligned such that stream to stream switching at a decoder may be accomplished in a substantially seamless manner). In addition, the streams are generated in a synchronized manner with respect to clock source 2105, such that GOP structures, sequence headers, I-picture location and other parameters (which are controlled via the profile unit 2160) are (if desired) aligned across a plurality of information streams. In this manner, stream splicing may be performed without noticeable video artifacts or audio artifacts, and without excessive latency.

A database 2102 provides program guide information to a plurality of video sources 2110V1 through 2110VN. Each of the plurality of video sources 2110V1 through 2110VN is associated with, illustratively, ten channels (i.e., AMC, Fox, HBO and the like). Each of the ten channels provides different programming material at different times of the day as denoted by programming grid 2050 in the interactive electronic program guide display 2000 of FIG. 20. Specifically, since the displayed portion of the programming grid 2050 comprises a 1.5 hour time interval, it is necessary to associate 16 (24 divided by 1.5) video streams with each ten channel block for each 24 hour period. That is, a first of the 16 video streams associated with the ten channel block is used to identify programming material from 12:00 AM through 1:30 AM, a second stream is used to identify programming material from 1:30 AM through 3:00 AM and so on. Thus, video source 1 (2110V1) provides 16 video information stream to video encoder 1 (2120V1), wherein each of the 16 video information streams includes program identification information for channels 1–10 for each of the 16 1.5 hour time intervals. That is, each of the 16 video streams is capable of providing the video layer used in electronic program guide display 2000 of FIG. 20 for a respective 1.5 hour time period.

Included within the program guide display 2000 is, of course, the video barker 2020. Associated with the video barker 2020 is the audio stream A produced by audio source 2110A and encoded by audio encoder 2120A. The 16 video streams produced by video encoder 2120V1, the audio stream produced by audio encoder 2120A, and a reference clock CL produced by a clock source 2105 are coupled to a first transport multiplexer 2130-1. Similarly, 16 video information streams representing 24 hours of programming data for channels 11 though 20 are produced by a second video source 2110V2, and coupled to a second video encoder 2120V2. The 16 encoded video streams V2 produced by second video encoder 2120V2 are coupled to a second transport multiplexer 2130-2 along with the audio stream A and clock stream CL. Similarly, the Nth video source 2110VA produces 16 video information streams associated with a 24 hour programming period for the N-9 through Nth channels in the system. The 16 video information streams produced by the Nth video stream 2110VN are coupled to an Nth video encoder 2120VN where they are encoded. The Nth group of 16 encoded video information streams VN is then coupled to an Nth transport multiplexer 2130-N, along with the audio stream A produced by audio encoder 2120A and the clock signal CL produced by clock source 2105.

Each of the transport multiplexers 2130-1 through 2130-N produces a respective output transport stream T1 through TN that is coupled to a respective intermediate frequency (IF) modulator 2140-1 through 2140-N. Optionally, the transport streams T1 through TN are coupled to file server 2170 for storage prior to subsequent delivery to the respective IF modulators 2140-1 through 2140-N. The IF modulators 2140-1 through 2140-N produce respective IF output signals which are then coupled to RF modulator 2150. The RF modulator 2150 modulates the respective IF signals onto a carrier frequency for subsequent transmission via a forward channel.

It is important to note that, while the transport multiplexing function is depicted as being performed by a plurality of transport multiplexers 2130-1 through 2130-N, the transport multiplexing function may also be performed using a single transport multiplexer. Additionally, while the IF modulation function is depicted as being performed by a plurality of IF modulators 2140-1 through 2140-N, the IF modulation function may also be performed using a single IF modulator. The main constraint placed upon the IF modulation function relates to the available bandwidth within the forward channel FC. That is, since each IF modulated signal IF1 Through IF-N is capable of carrying data at a maximum bitrate (e.g., 27 Mbps in a 64 QAM modulation scheme), the total data rate of the transport stream(s) within the IF modulated signal cannot exceed the available bandwidth. Thus, in the case where very high data rate streams are transport encoded, it may be necessary to use several IF modulators to produce a corresponding several IF modulated signals for transmission via the forward channel FC.

A control and applet source 2110D provides control information and applet data information (i.e., subscriber side programs provided by the server) to a packetizer 2120D, illustratively an MPEG2 packetizer producing an auxiliary data stream DATA. The auxiliary data stream DATA is coupled to RF modulator 2150 and, optionally, each of the transport multiplexers 2130-1 through 2130-N. In the case of the auxiliary data stream DATA being coupled to each of the transport multiplexers, the resulting multiplexed transport streams T1 through TN will each include the control and applet data such that retrieval of any one of the multiplexed transport streams from the forward channel by a set top terminal will yield control data and applet data sufficient to run any appropriate subscriber side programs.

The RF modulated data is coupled to a forward channel within e.g., a cable television system or other information distribution system. The information distribution system is denoted as data pipe DP and is coupled to a plurality of neighborhood information distribution systems 2190-1 through 2190-3. Each of the neighborhood distribution systems 2190-1 through 2190-3 is coupled to a plurality of set top terminals.

Figure 22:
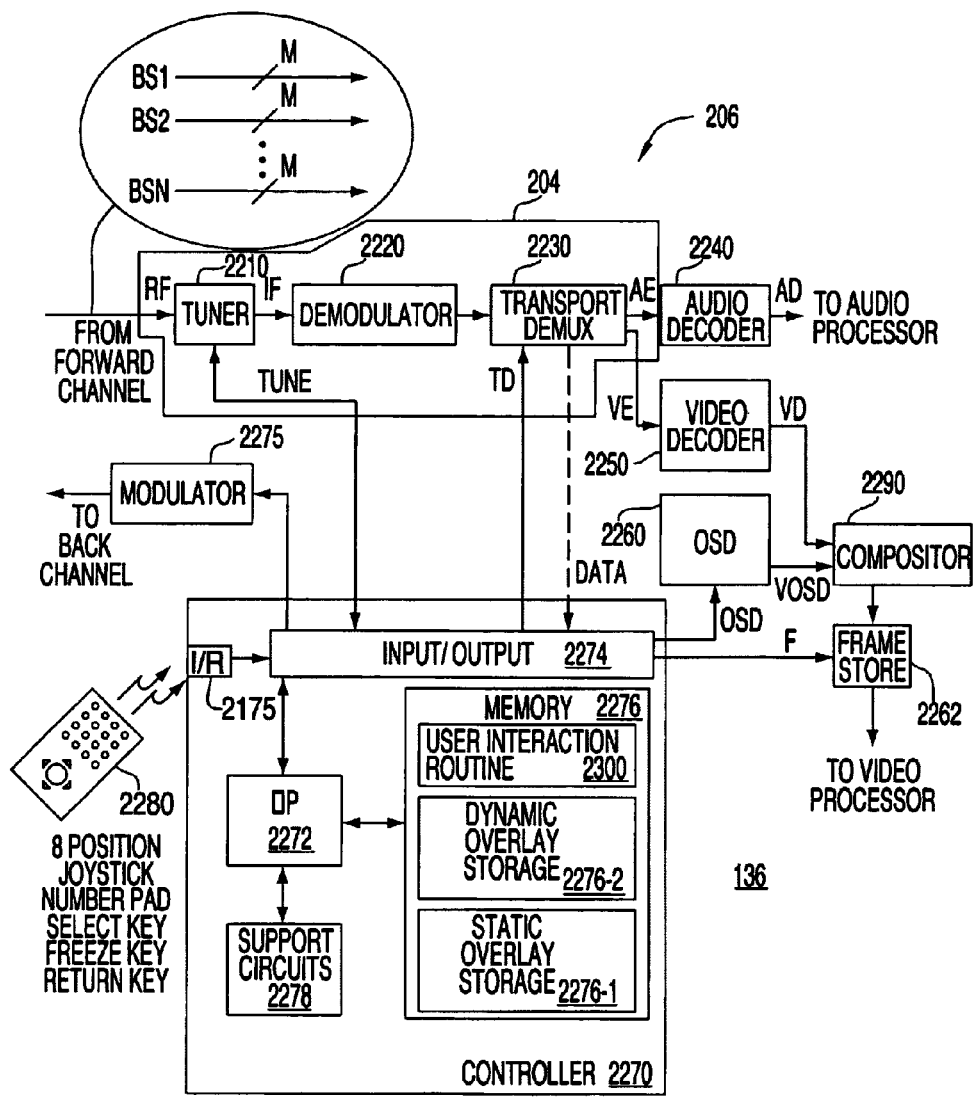
FIG. 22 depicts an example of a set top terminal suitable for use in an interactive information distribution system.

FIG. 22 depicts subscriber equipment suitable for use in the present invention. Specifically, FIG. 22 depicts a set top terminal (STT) 136 comprising an information receiver 204, a decoder 206 an onscreen display processor (OSD) 2260, a frame store memory 2262, a compositor 2290 and a controller 2270. The information receiver 204 comprises a tuner 2210, a demodulator 2220, and a transport demultiplexer 2230. The decoder 206 comprises an audio decoder 2240 and a video decoder 2250. User interaction is effected via a remote control unit 2280. Tuner 2210 receives, e.g., a radio frequency (RF) signal comprising a plurality of quadrature amplitude modulated (QAM) information signals from a forward channel such as a hybrid fiber-coax network of a cabletelevision system. Tuner 2210, in response to a control signal TUNE, tunes to a particular one of the QAM information signals to produce an intermediate frequency (IF) information signal. Demodulator 2220 receives and demodulates the intermediate frequency QAM information signal to produce an information stream, illustratively an MPEG transport stream. The MPEG transport stream is coupled to a transport stream demultiplexer 2230.

Transport stream demultiplexer 2230, in response to a control signal TD produced by controller 2270, demultiplexes (i.e., extracts) an audio information stream AE and a video information stream VE. The audio information stream AE is coupled to audio decoder 2240, which decodes the audio information stream and presents a decoded audio information AD stream to an audio processor (not shown) for subsequent presentation. The video stream VE is coupled to the video decoder 2250, which decodes the compressed video stream VE to produce an uncompressed video stream VD that is coupled to the compositor 2290. OSD 2260, in response to a control signal OSD produced by controller 2270, produces a graphical overlay signal VOSD that is coupled to the compositor 2290.

Optionally (e.g., in the absence of a default or predetermined overlay design), transport stream demultiplexer 2230 retrieves a data stream DATA, illustratively an auxiliary data stream or user data stream according to, e.g., the MPEG standards. The retrieved data stream DATA provides information regarding overlay parameters and other program guide information. The retrieved data stream may also include other profile parameters inserted into the forward channel bitstreams by a profile unit 2160 of FIG. 21.

Additionally, in one embodiment the data stream identifies sequence header location, GOP structure, coding parameters, PID locations, program map tables and other information suitable for use by controller 2270 in, e.g., selecting appropriate decoding or processing parameters.

The compositor 2290 merges the graphical overlay signal VOSD and the uncompressed video stream VD to produce a modified video stream (i.e., the underlying video images with the graphical overlay) that is coupled to the frame store unit 2262. The frame store unit 2262 stores the modified video stream on a frame-by-picture basis according to the frame rate of the video stream. Frame store unit 2262 provides the stored video frames to a video processor (not shown) for subsequent processing and presentation on a display device. The frame store unit 2262, in response to a control signal F produced by the controller 2270, "freezes" in memory (i.e., does not update) a presently stored video frame such that the video information provided to the video process results in a still image. This is useful when, e.g., a broadcast program guide utilizes scrolling information, a telephone number or address is briefly displayed or a user simply wants to view a presently displayed frame for a longer period of time.

Controller 2270 comprises a microprocessor 2272, an input/output module 2274, a memory module 2276, an infrared (IR) receiver 2275 and support circuitry 2278. The microprocessor 2272 cooperates with conventional support circuitry 2278 such as power supplies, clock circuits, cache memory and the like as well as circuits that assist in executing the software routines. The input/output circuitry 2274 forms an interface between the controller 2270 and the tuner 2210, the transport demultiplexer 2230, the onscreen display unit 2260, the back channel modulator 2295, and the remote control unit 2280. Although the controller 2270 is depicted as a general purpose computer that is programmed to perform specific interactive program electronic guide control function in accordance with the present invention, the invention can be implemented in hardware as an application specific integrated circuit (ASIC). As such, the process steps described herein are intended to be broadly interpreted as being equivalently performed by software, hardware, or a combination thereof.

The remote control unit 2280 comprises an 8-position joy stick, a numeric pad, a "select" key, a "freeze" key and a "return" key. User manipulations of the joy stick or keys of the remote control device are transmitted to a controller via an infra red (IR) link. The controller 2270 is responsive to such user manipulations at several levels of abstraction. Specifically, the controller interprets user manipulations as interaction model manipulations or interface model manipulations, which are described below.

Interaction model manipulations are those manipulations which depend only upon local processing resources, such as changing overlay object emphasis or selecting a new video stream within a previously tuned and demodulated transport stream (i.e., a sub-stream having only a different program identifier (PID) than the presently displayed sub-stream or tuning to another channel already present in the broadcast spectrum). Interface model manipulations are those manipulations which require interaction with the head end, such as selection of an object that requires a change from a broadcast mode of operation to a pointcast mode of operation. These modes will be described in more detail below. Briefly, in a broadcast mode of operation, many subscribers receive and utilize the same information stream. In a pointcast mode of operation, only one subscriber receives and utilizes a particular information stream. In a narrowcast mode, a relatively small number of subscribers receive and utilize a particular information stream. This is, essentially, a "shared pointcast" mode.

Referring to FIG. 20, emphasis and selection of promotional splash 2010 changes the context from the program guide context to, for example, a shopping guide context. Within the shopping guide context the user is allocated an individual interactive information stream (i.e., a pointcast stream) allowing the user to buy a particular product, browse a particular group of products or otherwise interact with the server. Similarly, selection of the logo object 2015 or any of the channel objects 2035 or channel number objects 2030 results in a narrowcast information stream that provides the user with general information associated with the companies or individuals identified with the logos or channel boxes. From the narrowcast, a user may change to a pointcast stream to retrieve more particularized information, i.e., the user may receive a narrowcast stream regarding pay per view movies and then select a particular movie for viewing. The particular movie is sent to the subscriber equipment as a pointcast stream. Similarly, if the user emphasizes and selects the video barker object 2020 a new stream is provided to the user in which the video barker may be displayed at full screen resolution or a promotional screen other than the video barker may be displayed. Optionally, ordering information for a pay per view event represented by the video barker may also be provided. Scrolling promotional banner 2055 may also be selected, bringing the user to a narrowcast or broadcast stream that provides a promotional video barker or other information. It should be noted that the time of day information and date information 2005 may be retrieved by the subscriber and utilized to synchronize the clock within the subscriber terminal.

Figure 23:
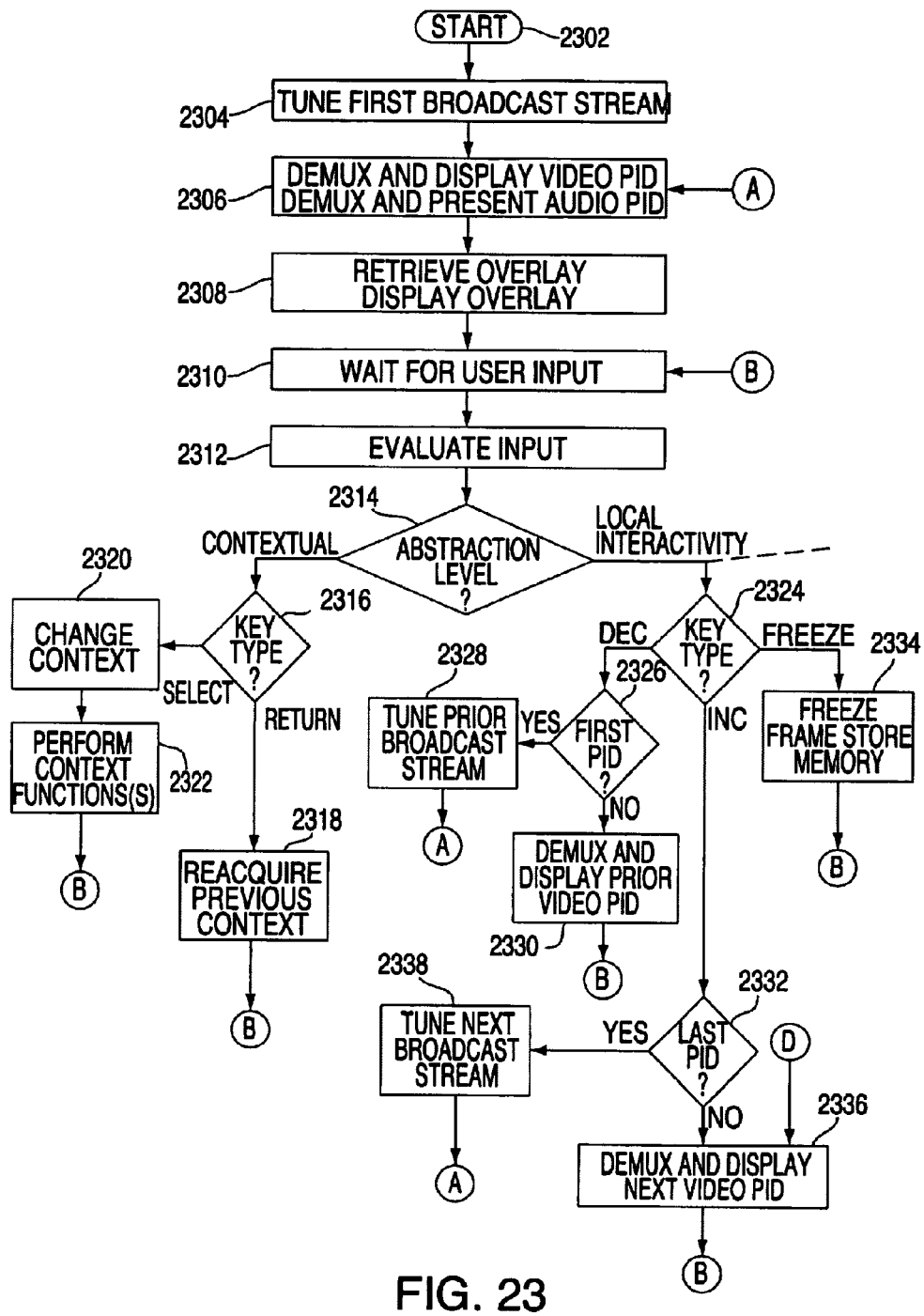
FIG. 23 depicts a flow diagram of a user interaction routine suitable for use in subscriber equipment of FIG. 21.

FIG. 23 depicts a user interaction routine 2300 according to the invention. The routine 2300 is entered at step 2302, when subscriber equipment is initially powered on or otherwise initialized. The routine 2300 then proceeds to step 2304, where a first or default stream is tuned and demodulated. The routine 2300 then proceeds to step 2306, where a first default video stream and associated audio stream is demultiplexed and displayed or presented. The routine 2300 then proceeds to step 2308, where an appropriate overlay is retrieved and displayed along with the displayed or presented video stream. The routine 2300 then proceeds to step 2310, where the processor waits for user input via, e.g., remote control device 2280.

Upon receipt of user input, the routine proceeds to step 2312, where the user input is evaluated. The routine 2300 then proceeds to step 2314, where a query is made as to whether the evaluation indicates that the abstraction level indicated by the user input is a contextual or local interactivity.

If the query at step 2314 indicates that the user interaction is such that the contextual level of the interactive experience is to be changed, then the routine proceeds to step 2316. At step 2316, a query is made as to which key has been pressed by the user. If the query at step 2316 indicates that the "return" key has been pressed, then the routine 2300 proceeds to step 2318, where the previous context is re-acquired. That is, in the case of a present pointcast mode such as a interactive shopping or pay per view context, activation of the "return" key on the remote control device indicates that a return to the previous context is required, which would typically mean that return to the program guide context is desired. The routine 2300 then proceeds to step 2310, where the processor waits for user input.

If the query at step 2316 indicates that the key pressed was the "select" key, then the routine proceeds to step 2320, where the context is changed in response to the emphasized object selected by the "select" key. The routine 2300 then proceeds to step 2322, where the selected context function or functions are performed, i.e., a pay per view session is initiated, a preview context is initiated, a product sales session is initiated and the like. Once viewing in the context is complete, the routine returns to the guide context. The routine then proceeds to step 2310, where the processor waits for user input.

If the query at step 2314 indicates that local interactivity only is requested by the user, then the routine proceeds to step 2324, where a query is made as to the type of key pressed by the user. If the query at step 2324 indicates that the "freeze" key has been pressed by the user, then the routine proceeds to step 2334, where the video frame presently stored in frame store unit 2162 is frozen. That is, the frame store unit 2162 is not updated by subsequent video frames until such time as the "freeze" key or other key is pressed again. The routine 2300 then proceeds to step 2310, where the processor waits for user input. If the query at step 2324 indicates that an increment key has been pressed (e.g., a temporal increment or channel increment) then the routine proceeds to step 2332.

At step 2332 a query is made as to whether the presently selected video stream, as indicated by the PID of the stream is, in fact, the last video stream within a particular broadcast stream. If the query at step 2332 is answered affirmatively, then the routine 2300 proceeds to step 2338, where the next broadcast stream is tuned. The routine 2300 then proceeds to step 2306, where the first video and associated audio streams of the newly tuned broadcast stream are demultiplexed and displayed or presented.

If the query at step 2332 is answered negatively, then the routine 2300 then proceeds to step 2336, where the next video stream (i.e., the next video PID) is demultiplexed and displayed. The routine 2300 then proceeds to step 2310, where the processor waits for user input.

If the query at step 2324 indicates that a decrement key was pressed (i.e., a temporal or channel identification decrement), then the routine 2300 proceeds to step 2326, where a query is made as to whether the presently selected video stream as indicated by the PID of the stream is, in fact, the first video stream in the presently tuned broadcast stream. If the query at step 2326 is answered affirmatively, then the routine 2300 proceeds to step 2328, where the previous broadcast stream associated with the decrement key (i.e., the previous broadcast stream including the temporal and/or channel information) is tuned. The routine 2300 then proceeds to step 2306. If the query at step 2320 is answered negatively, then the previous video stream associated with the appropriate parameter (i.e., temporal or channel parameter) is demultiplexed and displayed along with the associated overlay. The routine 2300 then proceeds to step 2310, where the processor waits for user input.

In one embodiment of the invention, multiplexed broadcast analog or digital video and static, pre-programmed bitmaps are utilized. In this embodiment, the re-programmed bitmaps are installed in the STT in, e.g., memory module 2176. The bitmaps are x-y grid borders that align with x-y grid borders built into the broadcast video streams, and are modified in color and/or degree of transparency to allow visual emphasis to be associated with a single object or set of objects.

In another embodiment of the invention, multiplexed broadcast analog or digital video and dynamic, pre-programmed bitmaps are utilized. In this embodiment, a variety of pre-programmed bitmaps are installed in the STT. These bitmaps may be x-y grid borders, circles, or any other delineator capable of providing adequate emphasis so that a user may discern the option of set of options representing an actionable field. These may align with borders built into the broadcast video streams and are modified in color and/or degree of transparency to allow visual emphasis to be associated with a single object or set of objects. The set top box can move back and forth between one set of bitmaps and another.

Synchronization of a particular set of installed bitmaps to a broadcast video stream is achieved through signaling linked to the broadcast video stream either through in-band data delivery, out-of-band data delivery, vertical blanking interval data delivery or other approaches known to those familiar in the art of data delivery in broadband networks. In another embodiment of the invention, multiplexed broadcast analog or digital video and dynamic, updateable bitmaps are used. In this embodiment, a variety of pre-programmed bitmaps may or may not be installed in the STT. As in the previous embodiment, these bitmaps may be x-y grid borders, circles, or any other delineator capable of providing adequate emphasis so that a user may discern the option of set or options representing an actionable field. These may align with borders built into the broadcast video streams and are modified in color and/or degree of transparency to allow visual emphasis to be associated with a single object or set of objects. The STT can move back and forth between one set of bitmaps and another. Synchronization of a particular set of installed bitmaps to a broadcast video stream and download of new bitmaps is achieved through signaling linked to the broadcast video stream either through in-band data delivery, out-of-band data delivery, vertical blanking interval data delivery or other approaches known to those familiar in the art of data delivery in broadband networks.

In another embodiment of the invention, text information is integrated into video streams to provide a video-based, remote cast interactive program guide. That is, text information is included within the downstream video portion as part of the onscreen program guide. This text information may comprise, e.g., stock quotes and other information.

Although various embodiments which incorporate the teachings of the present invention have been shown and described in detail herein, those skilled in the art can readily devise many other varied embodiments that still incorporate these teachings.

What is claimed is:

1. A system, comprising:
a video layer of a program guide for an interactive information distribution system, said interactive information distribution system having provider equipment and subscriber equipment, said video layer having at least one user selectable object associated with selectable video content sent from said provider equipment to said subscriber equipment, said video layer sent from said provider equipment to said subscriber equipment, said video layer containing a video region and a graphical region, said video region containing a video barker having associated audio, said graphical region containing a list of program titles; and a graphics layer of said program guide, where said graphics layer selectively overlays and provides emphasis and de-emphasis of said at least one user-selectable object in said video layer, said program guide being generated in a central location of said information distribution system, said graphics layer providing emphasis and de-emphasis by masking or revealing an object in the video layer.

2. The system of claim 1 wherein, to perform said masking and revealing, said graphics layer selectively changes an opacity of a region of said graphics layer.

3. The system of claim 1 wherein said video layer and graphics layer are contained in an applet.

4. The system of claim 1 wherein an identity of an emphasized object is controlled by a viewer.

5. The system of claim 1 wherein said emphasized object is user-selectable.

6. The system of claim 1 wherein said emphasized object is highlighted.

7. The system of claim 1 wherein said video layer contains a plurality of objects and said graphics layer emphasizes a select number of said objects and de-emphasizes a remainder of said objects.

8. The system of claim 7 wherein said objects are a list of program titles.

9. The system of claim 1 wherein said graphics layer is prestored in a user terminal.

10. The system of claim 1 wherein said graphics layer is transmitted to a user terminal.

11. A method, comprising:
generating, within service provider equipment of an information distribution system, a bitstream representing a program guide having a video layer and a graphics layer disposed over said video layer;
communicating said bitstream to subscriber equipment;
converting, within said subscriber equipment, said bitstream into a display of said program guide;
selectively providing at least one of emphasis and de-emphasis of at least one user-selectable object in said video layer that is associated with selectable video content sent from said provider equipment using said graphics layer; and
producing a mask/reveal overlay within said subscriber equipment.

12. The method of claim 11 wherein producing said mask/reveal overlay includes extracting said mask/reveal overlay from said graphics layer in said bitstream.

13. The method of claim 11 wherein said mask/reveal overlay is dynamically updated using information from said graphics layer that is extracted from said bitstream.

14. The method of claim 11 further comprising identifying objects in said display through manipulation of a user input device.

15. The method of claim 14 wherein identifying said objects includes emphasizing one of said objects.

16. The method of claim 15 further comprising selecting said emphasized object to initiate a new context.

17. The method of claim 16 wherein said new context is a preview video.

18. The method of claim 16 wherein said context is an advertisement video.

19. The method of claim 11 further comprising extracting at least two different program guides from said bitstream.

20. The method of claim 19 wherein each of said different program guides has audio that is common to another of said different program guides.

21. The method of claim 14 wherein identifying objects is preformed locally to said subscriber equipment.

22. The method of claim 11 further comprising identifying an object and selecting said identified object to synchronously jump from broadcast mode to pointcast mode.

23. The method of claim 22 further comprising returning to said broadcast mode when a pointcast transmission ends.

24. The method of claim 16 wherein selecting said identified object causes said graphics layer to emphasize certain objects with respect to remaining objects.

25. The method of claim 11 further comprising:
selecting said user-selectable object, when said user-selectable object is emphasized;
communicating the selection to said service provider equipment; and
sending, from said service provider equipment, a multi-media bitstream corresponding to said user-selectable object.

26. The method of claim 25 wherein said multi-media bitstream is a video-on-demand movie.

27. The method of claim 11 further comprising:
selecting said user-selectable object, when said user-selectable object is emphasized;
causing an event in said service provider equipment, where said event is one or more of tuning to an analog channel, tuning to a digital channel or launching a resident capability in said service provider equipment.

* * * * *